United States Patent
Maruyama et al.

[11] Patent Number: 6,118,635
[45] Date of Patent: *Sep. 12, 2000

[54] MAGNETIC STORAGE APPARATUS HAVING A HEAD WITH SLIDING PADS

[75] Inventors: Yoji Maruyama, Iruma; Makoto Aihara, Kodaira; Teruyoshi Higashiya, Odawara; Mikio Tokuyama, Tsukuba; Sadanori Nagaike; Tetsuji Higashijima, both of Odawara; Kazuo Nate, Machida; Hideki Sonobe, Odawara, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/546,096

[22] Filed: Oct. 19, 1995

[30] Foreign Application Priority Data

Oct. 20, 1994 [JP] Japan ..................... 6-255011
Jan. 31, 1995 [JP] Japan ..................... 7-014176

[51] Int. Cl.⁷ .......................... G11B 5/60; G11B 17/32
[52] U.S. Cl. ........................................ 360/246.2
[58] Field of Search ................... 360/104, 103, 360/102, 97.01, 97.02

[56] References Cited

U.S. PATENT DOCUMENTS

| | | | |
|---|---|---|---|
| 5,278,711 | 1/1994 | Gregory et al. | 360/103 |
| 5,285,337 | 2/1994 | Best et al. | 360/97.02 |
| 5,418,667 | 5/1995 | Best et al. | 360/103 |
| 5,488,521 | 1/1996 | Lemke et al. | 360/97.02 |
| 5,499,149 | 3/1996 | Dovek | 360/103 |
| 5,550,691 | 8/1996 | Hamilton | 360/103 |
| 5,898,540 | 4/1999 | Maruyama et al. | 360/130 |

FOREIGN PATENT DOCUMENTS

| | | | |
|---|---|---|---|
| 540282 | 9/1993 | European Pat. Off. . | |
| 558983 | 9/1993 | European Pat. Off. . | |
| 1-298585 | 12/1989 | Japan . | |
| 2-101688 | 4/1990 | Japan . | |
| 4214271 | 8/1992 | Japan | 360/103 |
| 4-281209 | 10/1992 | Japan . | |
| 6-89421 | 3/1994 | Japan . | |
| 6-150283 | 5/1994 | Japan . | |
| 94/11865 | 5/1994 | WIPO | 360/103 |

*Primary Examiner*—William R. Korzuch
*Attorney, Agent, or Firm*—Antonelli, Terry, Stout & Kraus, LLP

[57] ABSTRACT

Three pads are disposed on the surface of a magnetic head facing to a storage medium and are brought into contact with the surface of the storage medium through a lubricant layer. The total of areas of the three pads is equal to or larger than 0.0001 mm² and equal to or smaller than 0.02 mm² and the height of the pads is equal to or higher than 5 μm and equal to or lower than 100 μm. Two pads of the three pads include tapers formed in the front thereof and are disposed in a forward position in a relative movement direction to the storage medium and one remaining pad is disposed in a backward position. The total of areas of the two pads in the forward position is set to be narrower than an area of the pad in the backward position. A writing and reading function unit is provided in the pad in the backward position.

16 Claims, 20 Drawing Sheets

MAGNETIC STORAGE APPARATUS HAVING A HEAD WITH SLIDING PADS

BACKGROUND OF THE INVENTION

The present invention relates to a storage apparatus used in a computer, an information processing apparatus and the like and more particularly to a magnetic head contacting with a storage medium continuously and a large capacity magnetic storage apparatus using the magnetic head.

A semiconductor memory and a magnetic memory are mainly used as a storage apparatus of an information apparatus. The semiconductor memory is used as an internal storage apparatus from the viewpoint of an access time and the magnetic memory is used as an external memory unit from the viewpoint of a large capacity and non-volatility. The mainstream of the magnetic memory is a magnetic disk and a magnetic tape. These memories use an Al substrate or a tape made of synthetic resins having a magnetic thin layer as a medium thereof. In order to write magnetic information into the medium, a functional unit utilizing electromagnetic conversion operation is used. Further, in order to reproduce the magnetic information stored in the medium, another functional unit utilizing the magnetoresistive phenomenon, the giant magnetoresistive phenomenon or the electromagnetic induction phenomenon is used. These functional units are arranged in an input/output part named a magnetic head.

FIG. 1 is a schematic diagram illustrating a magnetic disk apparatus. A mechanical unit 10 of the magnetic disk apparatus includes a storage medium 1, a motor 2 for driving the storage medium, a magnetic head 3, and an actuator 5 for controlling a position of the magnetic head. The actuator 5 receives a positioning signal from a positioning circuit 41. When a write command signal is applied to a control circuit 40 from an external apparatus, the control circuit calculates a position to which the magnetic head 3 is to be moved and sends a signal to the positioning circuit 41. When the magnetic head is positioned completely, a writing signal (write information) is transmitted from the control circuit 40 to an input/output functional unit provided in the magnetic head. This signal is produced on the basis of a reference clock synchronized with a rotational speed of the storage medium.

When a read command signal is inputted from the external apparatus, the control circuit 40 calculates a position in which magnetic information is present and sends a signal to the positioning circuit 41 so as to move the magnetic head 3 to this position. When the positioning of the magnetic head is completed, the control circuit 40 actuates the input/output functional unit of the magnetic head 3 to detect the magnetic information. The read information is outputted to the external apparatus at a predetermined timing. The control circuit 40 can also produce an ON/OFF signal to be supplied to the motor 2 so as to rotate the storage medium 1 only when the signal is supplied to the control circuit from the external apparatus.

The magnetic head 3 is moved relatively to the storage medium 1 so that magnetic information is written into any position on the medium and the magnetic information is electrically reproduced to be read therefrom if necessary. It is necessary to develop the high density memorization technique in order to write a lot of information into one apparatus.

In order to achieve the high density memorization, a strong magnetic field is required to act on a small area. The magnetic field participates in transmission of information between the input/output functional unit disposed in the magnetic head and the storage medium and when a distance between the magnetic head and the medium is separated, the magnetic field is attenuated rapidly. Accordingly, in order to attain the high density memorization, it is necessary to bring the magnetic head near to the storage medium. In a recent magnetic disk apparatus, the storage medium and a magnetic pole of the input/output functional unit are brought near to each other so that a distance therebetween is within 0.1 $\mu$m. Thus, the magnetic head is airborne or flown on the storage medium in order to control the distance stably. The flying height of the magnetic head in the air is required to be held fixed upon input/output of information and accordingly the relative speed of the magnetic head and the medium is maintained fixed in a certain range. It is apparent that there is a possibility that a magnetic storage apparatus having the memory density of 2 Gb/in$^2$ class can be attained by using the technique for air bearing the magnetic head.

The storage apparatus is required to store information with the higher density in view of miniaturization of recent information apparatuses and increase of information content. In order to attain this requirement, there is proposed a contact recording method in which a magnetic head is brought into contact with a medium to perform input/output operation (R/W). For example, U.S. Pat. No. 5,174,012 discloses a magnetic head structure (including a supporting arm) and U.S. Pat. Nos. 5,163,218 and 5,327,310 disclose a point-contact type magnetic head. Further, EP-A-540,282 and U.S. Pat. No. 5,267,104 also disclose a magnetic storage apparatus of a contact recording system.

SUMMARY OF THE INVENTION

In a magnetic storage apparatus, a magnetic head and a medium are moved relatively to each other and accordingly when a writing frequency is fixed, a relative speed can be reduced to increase the storage density. Further, it is known that when the electromagnetic conversion operation is utilized in reading, the higher the relative speed, the larger the output is obtained and a signal-to-noise ratio is improved. In this manner, if the relative speed can be varied arbitrarily, a high-performance storage apparatus can be attained. In a conventional air bearing or flying type magnetic head, however, since a distance between the magnetic head and a medium is always required to be maintained fixed, the relative speed cannot be varied in response to the input/output operation.

In a contact recording system in which a magnetic head is brought into contact with a medium, a distance between the magnetic head and the medium does not depend on a relative speed of the medium and the magnetic head. Accordingly, it is considered that the relative speed upon input/output can be varied arbitrarily.

When the point-contact type, i.e. one pad slider type magnetic head disclosed in the above publication was made on an experimental basis and reading/writing experiments thereof were made, a stable output was obtained on very limited condition that a peripheral speed of a storage medium is (4±0.4) m/second and a load of the magnetic head pressed on the medium is (500±10) g/cm$^2$ by optimizing material of a lubricant layer, material of protection layers disposed on surfaces of the magnetic head and the medium and the load, while when the condition was off from the above condition range, the stable output could not be obtained. Further, when the magnetic head performed a seeking operation, the magnetic head could not be sometimes positioned in a target position including a scattered range even within the above condition range. FIG. 2A shows an example of an output waveform of the point-contact type magnetic head made on an experimental basis. This output waveform is largely different from that of a flying type magnetic head shown for comparison. It has been ascertained that these phenomena are caused by the fact that a contact point is not stable. Accordingly, the point-contact type magnetic head could not realize the magnetic storage apparatus capable of varying the medium speed arbitrarily.

It was understood that this problem can be improved to a certain degree by providing two pads each having a taper disposed in a sliding or air bearing surface of the magnetic head and one pad having an input/output functional portion as shown in U.S. Pat. No. 5,327,310. This magnetic head has a basic configuration equal to that of a flying type magnetic head and hence can be manufactured by the process equal to a conventional method. In this magnetic head having the above structure, since the two pads having the tapers are air borne and another remaining pad is brought into point contact with the medium, variation of the contact point is difficult to occur.

As shown in FIG. 3, the basic operation of this system resides in that a front portion of a magnetic head 3 is floated or flown from a medium 1. Accordingly, an end of a writing and detection (reading) function portion 41 disposed in a pad at a rear position has a slight inclination in respect to a medium surface. Consequently, a gap a is necessarily produced and the magnetic head and the medium are not in an ideal contact state. A loss of an output value due to this gap is estimated as about 5 dB and it cannot be neglected in development of the high density storage apparatus. Further, since the two front pads are required to be air borne, there is a drawback that the relative speed of the magnetic head and the medium cannot be selected arbitrarily.

It is an object of the present invention to provide a high density storage apparatus capable of varying the relative speed of a medium and a magnetic head arbitrarily, and it is another object of the present invention to provide or a contact slider type magnetic head indispensable for realizing the high density storage apparatus.

In the present invention, a magnetic head having the structure described below is used to configure a contact type magnetic storage apparatus and a relative speed of a storage medium and the magnetic head upon inputting and outputting operation is varied arbitrarily to attain a high density magnetic memorization.

Three pads are disposed on a sliding surface of the magnetic head, and the pads and the surface of the storage medium are brought into contact with each other through a liquid or solid lubricant layer. The total of areas of the three pads is set to a range from 0.0001 mm$^2$ to 0.02 mm$^2$. Two pads of the three pads are disposed in a forward position of the storage medium being moved relatively to the magnetic head and one remaining pad is disposed in a backward position. An area of the pad in the backward position is wider than the total of areas of the two pads in the forward position. A writing and reading function unit is provided in the pad in the backward position. The height of the pad is set to be equal to or higher than 5 $\mu$m and equal to or lower than 100 $\mu$m. In order to contact the three pads with the surface of the medium stably, a vertical angle of two virtual lines connecting the two pads in the forward position and the pad in the backward position, respectively, is set to a range of 30° to 90°. The two pads disposed in the forward position include tapers formed in the front ends thereof.

A joining point of a gimbal member is positioned at a position which overlaps a virtual triangle having the three pads disposed on the sliding surface of the magnetic head as vertexes. The magnetic head is pressed on the surface of the storage medium by the gimbal member with a contact load from 4 g/cm$^2$ to 400 g/cm$^2$.

When the magnetic head is slid on the storage medium while being brought into contact with the storage medium, both of the magnetic head and the storage medium are worn, while the magnetic head is worn remarkably as compared with the storage medium because of a difference of a contact time in view of a particular point. Since an allowable amount of abrasion of the magnetic head is determined by an allowable amount of abrasion at a tip of a magnetic pole for writing information, it is effective to lengthen a length of a magnetic path of the magnetic pole for writing in order to increase the allowable abrasion amount of the magnetic head. However, when the magnetic path is lengthened, an induction efficiency of the magnetic field is reduced and a strong magnetic field cannot be produced. On the other hand, since the high density memorization uses a storage medium having large coercive force, a strong magnetic field for writing is required. Accordingly, the length of the magnetic path of the magnetic pole for writing cannot be lengthened so much and the amount of abrasion of the magnetic head allowable to suppress deterioration in performance of the magnetic pole for writing to the utmost is estimated as about 1 $\mu$m.

FIG. 4 is a graph showing a relation of a specific abrasion amount and a load in the case where abrasion of 1 $\mu$m is permitted for 10 years when the life of the magnetic disk apparatus is assumed to be 10 years. Circles in FIG. 4 represent the specific abrasion amount estimated for a magnetic head of a magnetic disk apparatus including protection layers for a storage medium and the magnetic head made of carbon, a surface of the storage medium ground to suppress coarseness thereof to 2 nm or less, and a lubricant layer having increased wettability with respect to the storage medium by means of the thermal process and canalization of the surface of the storage medium. The hatched area of FIG. 4 is an area in which the life is satisfied.

It is understood from FIG. 4 that the specific abrasion amount can be set to be large by reducing the load. Particularly, it is understood that the specific abrasion amount for satisfying the apparatus life of 10 years is obtained by setting the load to 400 g/cm$^2$ or less.

Then, an area of the sliding surface, that is, the total area of the pads was varied while the maximum load of 400 g/cm$^2$ was applied and the proximity performance of the pad area and the storage medium was measured. The result thereof is shown in FIG. 5. It is understood from FIG. 5 that the smaller the pad area the shorter the distance, so that the proximity performance is superior. It is considered that this reason is that unevenness existing on the surface of the storage medium and undulation having a long period and existing in the whole storage medium are apt to be absorbed as the pad area is reduced. Further, it is also considered that the effect of mitigating the meniscus effect of the lubricant onto the pad surfaces is also affected.

Further, it is understood that the proximity is scattered largely and the satisfactory contact state is not maintained on condition that the pad area exceeds 0.02 mm$^2$ (on condition that a distance of 60 nm is exceeded). It is considered that this reason is that the pad surface is floated or flown though it is for a short time. When the load is reduced to be set to 4 g/cm$^2$ and the pad area is set to 0.0002 mm$^2$, the distance was scattered. It is understood from this result that when the load is reduced, the proximity performance is deteriorated.

It is understood from the above experimental results that it is necessary that the load of the magnetic head is set to 400 g/cm$^2$ or less in order to satisfy the apparatus life of 10 years and the pad area is reduced to 0.02 mm$^2$ in order to maintain the stable contact state.

The foregoing is the description about the upper limit. The lower limit is determined by the mechanical strength. The mechanical strength of the pad is reduced as the pad area is reduced. The magnetic head is slid on the storage medium, while in order to suppress the floating or flying force received by the magnetic head at this time, it is necessary to form the pads into a cylindrical shape as described later and the pads are formed into a smaller cylinder as the pad area is reduced, and the mechanical strength thereof is reduced. The pad area could not be made smaller than 0.0001 mm$^2$ because of this restriction. Accordingly, it is necessary to set the pad area to a range of 0.0001 mm$^2$ to 0.02 mm$^2$.

Further, it is also understood from FIG. 5 that the load must be set to a range of 4 g/cm$^2$ to 400 g/cm$^2$ in order to maintain the stable contact state in the range of the pad area of 0.0001 mm$^2$ to 0.02 mm$^2$.

FIG. 6 shows a relation of the height of the pad and the proximity distance. It is understood from FIG. 6 that when the height of the pad is set to a range of 0.01 μm to 1.0 μm, the proximity performance is deteriorated. It is considered that this reason is that the magnetic head is flown by air flowing into the magnetic head surface in which the pads are provided. When the magnetic head is flown, the stable contact state cannot be maintained. Accordingly, it is understood from FIG. 6 that the height of the pads is required to be equal to or higher than 5 μmm in order to suppress the air flying or air bearing operation. This restriction is to be applied to the magnetic head operated in air and when the magnetic head is operated in gas lighter than air or in vacuum, the height of the pad can be made smaller than 5 μm. The upper limit of the pad height is determined by the mechanical strength. When the height of the pad is increased, the mechanical strength is reduced as described above. The pad height allowable for the pad having the area of 0.02 mm$^2$ was about 100 μm.

The magnetic storage apparatus according to the present invention comprises the function of varying a relative speed of the magnetic head and the storage medium in the state where the sliding surface of the magnetic head having the input/output function of magnetic information and the storage medium are brought into contact with each other through a lubricant layer continuously. The relative speed may be varied depending on a kind of information to be inputted and outputted or may be varied depending on the writing operation and the reading operation of information.

Further, there are provided a function of detecting a storage position from magnetic information previously provided in the storage medium and a function of detecting the relative speed of the storage medium and the magnetic head, and a clock signal is generated on the basis of the detected relative speed. The clock signal is supplied to a positioning functional unit.

A recess is formed in part of an area surrounded by three pads disposed on the sliding surface of the magnetic head. When the height from the surface of the recess area to the pad surface is $h_1$ and the height from the surface of other area to the pad surface is $h_2$, a relation of $h_1 > h_2$ is set between the heights $h_1$ and $h_2$ to thereby be able to attain the self-loading and self-unloading function that the magnetic head is brought into contact with the storage medium by utilizing a negative pressure produced in the magnetic head when the storage medium is driven.

When three pads are disposed on the sliding surface of the magnetic head, the surface of the magnetic head is held with respect to the storage medium stably. When the pads are brought into contact with the surface of the storage medium through a liquid or solid lubricant layer, mechanical abrasion at contact point can be prevented. Accordingly, damage of the magnetic head and the storage medium can be suppressed and the apparatus life can be prolonged.

The total of areas of the three pads of the magnetic head can be set to a range of 0.0001 mm$^2$ to 0.02 mm$^2$ to thereby reduce the total of the air floating or flying force produced on the pad surface to a negligible level. Accordingly, only by pressing the magnetic head onto the storage medium with a small load, the magnetic head can be brought into contact with the storage medium stably at any relative speed.

Two pads provided in the magnetic head is disposed in the forward position of the storage medium being moved relatively to the magnetic head and one remaining pad is disposed in the backward position. An area of the pad in the backward position can be made wider than the total of areas of the two pads in the forward position to thereby make the frictional force received by the surface of the pad disposed in the backward position larger than the frictional force received by the surface of the pads disposed in the forward position. By supporting the magnetic head in a position nearer to the forward side with respect to the position in which the backward one pad in disposed and the larger frictional force is produced, the posture of the magnetic head can be maintained stably. Since variation of the relative speed and variation of the frictional force are propotional to each other, the frictional force of the pad disposed in the backward position is larger than the total of the frictional forces of the two pads disposed in the forward position at any relative speed. Accordingly, the posture of the magnetic head can be maintained stably at all relative speed and the contact point can be held stably.

Further, when a vertical angle of two virtual lines connecting the two pads in the forward position and the pad in the backward position, respectively, is set to a range of 30° to 90°, the spatial balance among the three pads is improved. Accordingly, a large restoring torque is produced in the state where only one side of the magnetic head abuts against the medium, so that the three pads can be brought into contact with the surface of the medium stably.

The pad disposed in the backward direction is always brought into contact with the surface of the storage medium. Accordingly, at least the magnetic path for the writing and reading functional unit is provided in the surface of this pad to be able to contact the input/output functional unit with the storage medium through the lubricant layer. The pad in the backward position is substantially positioned on the center line of an arm for supporting the magnetic head. Accordingly, even if vibration is produced when the magnetic head collides with an alien substance on the surface of the storage medium, the stable contact can be maintained.

The above function is achieved by joining the gimbal member at a position which overlaps a virtual triangle having said three pads disposed on the sliding surface of the magnetic head as vertexes. By forming the gimbal to have the sufficient mechanical strength, the posture of the magnetic head is determined by using the point supported by the gimbal as a fulcrum. Thus, variation of the posture of the magnetic head due to the frictional force and the collision with the alien substance can be suppressed.

The magnetic head can be pressed on the surface of the storage medium by means of the gimbal member to thereby suppress the magnetic head from being floated or flown from the surface of the medium. When the total of areas of the three pads is set to a range of 0.0001 mm$^2$ to 0.02 mm$^2$, stable contact can be attained in the range of load of 4 g/cm$^2$ to 400 g/cm$^2$. Further, when the magnetic head is pressed on the surface of the storage medium with a load exceeding 400 g/cm$^2$, the frictional force produced in the pad surface is increased and the pad surface and the medium surface were worn. When the pad surface is worn, the magnetic path for the input/output functional unit and the magnetic body are damaged and the apparatus life is made short. By controlling the load within the above range, the stable contact can be sustained and the long life of the storage apparatus can be attained.

By forming tapers in the front portions of the two pads disposed in the forward position, even if the magnetic head collides with an alien substance, shock can be reduced. Such taper structure is also provided in the air bearing or flying type magnetic head, while in the present invention the taper is not used in order to obtain the air bearing or flying force and accordingly the function of the taper is different.

By contacting the magnetic head with the medium, a distance between the medium and the magnetic head is always maintained to be fixed and accordingly the relative movement speed can be varied arbitrarily. Hence, the recording density can be increased by reducing the relative speed when the writing frequency is set constant and when the electromagnetic conversion is utilized in the reading operation, a reading output can be increased by increasing the relative speed.

Further, the relative speed to the medium can be varied depending on a kind of information to be inputted and outputted. For example, when image data which permits an input and output error to a certain degree and requires high-speed input and output operation is inputted or outputted, the relative speed of the medium and the magnetic head is increased, and when computer data requiring the reliability is handled, the relative speed can be reduced. By constituting the reading functional unit by a magnetoresistive effect device having detection sensibility which does not depend on the relative speed, data can be read out with high sensibility even if the relative speed is reduced.

The shape of the front edge in the relative movement direction of the pad disposed in the backward position and in which the writing and reading element is provided can be formed to be sharp to thereby attain the satisfactory sliding operation. Operation thereof is now described.

As shown in FIGS. 7A and 7B, front pads 21 and 22 and a pad 24 in the backward position having the writing and reading functional unit are disposed on the sliding surface of the magnetic head 3. When the pad 24 in the backward position is formed to be sharp in the medium movement direction, excessive lubricant can be removed laterally while the sliding surface encroaches upon the lubricant layer existing on the recording medium properly.

FIG. 11 shows a measured result of a relation of a yaw angle and an output for a sharpened pad. It is understood from FIG. 11 that substantially stable (high) output can be obtained in the range of ±23 degrees of yaw angle. In this connection, FIGS. 12 and 13 show the relation of a yaw angle and an output in the case of using a square type pad described in U.S. Pat. No. 5,327,310. It is understood from FIGS. 12 and 13 that the range in which an stable output is obtained is limited to the range of ±10 degrees or ±15 degrees of yaw angle and an permissible range of yaw angle is narrowed as compared with the case where the sharpened pad is used. This difference is the effect obtained by using the sharpened pad.

This reason is described by using FIGS. 10A to 10C. As shown in FIGS. 10A and 10B, when a pad 23 having the element is formed into a square and is short or narrow in the sliding direction, excessive lubricant 61 is checked by a front edge of the pad 23 as shown in FIG. 10C and becomes a cause that the posture of the magnetic head is disturbed. In order to prevent this phenomenon, it is necessary to change areas of the right and left pads in the forward position or pull all lubricant below the pad by inclining the sliding surface. The latter countermeasure corresponds to a three-pad type magnetic head for floating a front pad as described in U.S. Pat. No. 5,327,310. When the pad in the forward position is floated or flown, the faster the peripheral speed, the larger the flying force and conversely as the peripheral speed is reduced, the flying force is made small. Accordingly, when the yaw angle is varied, a difference occurs in the flying forces produced in the right and left pads and the posture of the head is varied at the extreme. When the posture of the magnetic head is varied, an effective distance between the medium and the magnetic head is also varied and accordingly it is considered that the output is varied.

The problem by this influence is coincident with the result of FIGS. 12 and 13 described above. With the shape of the present invention, excessive lubricant can be removed stably without flying the front pads 21 and 22 to thereby realize the stable input/output operation within the wide range of yaw angle.

Further, examples where the sharpened pad is provided in the sliding surface can be found in JP-A-4-281209, JP-A-1-298585, EP-A-558,983 and JP-A-2-101688. Since magnetic heads in these examples are of the flying type, pads are required to produce the flying force. Accordingly, it is apparent that the pads have wide areas and cannot be utilized for the purpose of the present invention in which the medium is brought into contact with the head. According to our experiment, in order to prevent the pad from being flown and attain stable sliding, it is necessary that the total of areas of the three sliding pads is made equal to or larger than 0.0001 mm$^2$ and equal to or smaller than 0.02 mm$^2$. Accordingly, it is necessary to limit the pad area within this range in implementation of the present invention.

The same effect as the sharpened pad is obtained by using a pad 24-2 which is long in the sliding direction as shown in FIGS. 8A an 8B. It is considered that this reason is that since the pad is long, the sliding surface can encroach upon the lubricant layer existing on the recording medium effectively by flying front pads slightly (20 nm or less).

Further, the same effect is obtained even by providing tapers in the forward direction of a plurality of pads constituting the sliding surface of the magnetic head. As shown in FIGS. 9A and 9B, when a taper is formed in the flowing-in side of lubricant of a pad 24-3, it can be prevented that lubricant is gathered in an edge of the pad. This phenomenon can be easily understood since the lubricant has the fluidity. In this case, front pads 21 and 22 are not required to be flown (it is unnecessary to incline the head). This is a feature which cannot be obtained heretofore and it is convenient when an element and a medium surface approach each other.

As described above, by using the pad shape described in the present invention, excessive lubricant can be removed effectively without changing the posture of the head (without flying the front pads highly). Accordingly, the magnetic head can be slid continuously within the wide range of yaw angle.

The function of detecting positional information from magnetic information previously provided in the storage medium is generally used in the air flying type magnetic storage apparatus. Even in the present invention, positional information can be detected by the same method. However, in the flying type magnetic storage apparatus, the relative speed of the storage medium and the magnetic head is not varied. Accordingly, a clock necessary for positioning and generated in synchronism with the relative speed is inputted externally (from an oscillator in an apparatus). In the present invention, since variation of the relative speed of the storage medium and the magnetic head is allowed, any problem occurs as it is. Accordingly, a relative speed detection function is newly provided in the present invention. A clock is produced from this speed detection function on the basis of the relative speed and is supplied to the positioning functional unit. Thus, the same positioning as the flying type magnetic storage apparatus can be made even in any relative speed.

When the storage medium is moved (rotated) at a high speed, the floating or flying force acts on the sliding surface of the magnetic head. In order to suppress this force, a load may be increased. However, when the load is increased, the frictional force is increased in the case where the relative speed is reduced. This problem can be solved by setting the height of the pad from the sliding surface to be equal to or higher than 5 μm and equal to or lower than 100 μm. When the height of the pad was made lower than 5 μm, a floating or flying force occurred in the surface of the magnetic head provided with the pads and facing to the storage medium and the magnetic head could not be suppressed from being floated or flown. Conversely, when the height of the pad exceeds 100 μm, a problem occurs in working a small area pad and the mechanical strength in the sliding direction is reduced to thereby produce a problem that the pads are distorted.

The height of the pads is limited in the above range and as shown in FIGS. 14A and 14B when the height from the surface of part of an area surrounded by the three pads to the pad surface is $h_1$ and the height from the surface of other area to the pad surface is $h_2$, the relation of $h_1 > h_2$ is provided between the heights $h_1$ and $h_2$. Consequently, when the medium is moved, a negative pressure occurs between the medium and the magnetic head. This negative pressure has the same effect as the load from the gimbal for supporting the head and is effective to keep the posture of the magnetic head stably. Further, since the negative force acts only when the magnetic medium is moved, the mechanical load for pressing the magnetic head on the medium surface is added in the minus direction and an absolute value of the load is made smaller than the negative pressure, so that the self-loading function for loading the magnetic head only upon occurrence of the negative pressure and unloading the magnetic head when the medium is stopped can be realized.

Other aspects of the present invention are now described.

Generally, the shearing force F acting between two substances moved relatively to each other is calculated by the following expression 1 where the coefficient of viscosity of fluid existing between the two substances is μ, a relative speed between the two substances is U, a distance between the two substances is Z, and an area of a surface is S.

$$F = \mu \cdot \frac{dU}{dZ} \cdot S \quad (1)$$

A configuration in which the moving direction of the slider upon the seeking operation is the width direction and which includes sliding protrusions disposed on both the sides in the width direction and a supporting point of the slider disposed in the middle thereof is assumed. In this configuration, when contact areas of opposing surfaces to the magnetic disk of the sliding protrusions are equal, the shearing forces acting on an inner-peripheral-side protrusion and an outer-peripheral-side protrusion are different in magnitude due to a difference in peripheral speeds of the magnetic disk contacting with the respective protrusion. Thus, the rotation moment always occurs in the internal direction perpendicular to the surface of the magnetic disk about the slider supporting point for supporting the slider. Consequently, the magnetic head slider has a tendency to vibrate. Further, by moving (seeking) the magnetic head slider from a certain cylinder to another cylinder, the magnetic head slider has a tendency to vibrate.

It is a first object of the present invention to provide a contact recording magnetic head slider and a magnetic head slider supporting mechanism capable of reducing vibration of the magnetic head slider due to the shearing force to slide the slider on a magnetic disk stably.

In order to achieve the above object, in the first aspect of the present invention, in the magnetic head slider including a magnetic head element and two sliding protrusions disposed in the inner peripheral direction and the outer peripheral direction of the magnetic disk with respect to the magnetic head element, a contact area with the magnetic disk of the sliding protrusion on the inner peripheral side is made larger than a contact area with the magnetic disk of the protrusion on the outer peripheral side.

Further, in the second aspect of the present invention, the contact areas with the magnetic disk of the two sliding protrusions in the first aspect is inversely proportional to peripheral speeds of the magnetic disk contacting with the two protrusions.

In the third aspect, in the magnetic head slider including a magnetic head element and two sliding protrusions disposed in the inner peripheral direction and the outer peripheral direction of the magnetic disk with respect to the magnetic head element, contact areas with the magnetic disk of the two sliding protrusion are the same and the sliding protrusion on the inner peripheral side is offset so that an interval between the magnetic head element and the sliding protrusion on the inner peripheral side is larger than an interval between the magnetic head element and the sliding protrusion on the outer peripheral side.

In the fourth aspect of the present invention, the interval between the magnetic head element and the sliding protrusion on the inner peripheral side and the interval between the magnetic head element and the sliding protrusion on the outer peripheral side in the third aspect are inversely proportioned to the peripheral speeds of the magnetic disk contacting with the two sliding protrusions.

In the fifth aspect of the present invention, in the magnetic head slider including a magnetic head element and two sliding protrusions disposed in the inner peripheral direction and the outer peripheral direction of the magnetic disk with respect to the magnetic head element, coarseness of the contact surface with the magnetic disk of the sliding protrusion on the inner peripheral side is larger than that of the protrusion on the outer peripheral side.

In the sixth aspect of the present invention, in the magnetic head slider supporting mechanism including a magnetic head slider extending in the radial direction of the magnetic disk and having a plurality of protrusions contacting with the magnetic disk, and a carriage for supporting the magnetic head slider by a supporting portion and being angularly moved on the magnetic disk about the rotation center, the carriage supports the magnetic head slider through the supporting portion at a position in which the rotation moment produced by the protrusion positioned nearer to the rotation center than the supporting portion of the magnetic head slider is equal to the rotation moment produced by the protrusion positioned farther from the rotation center than the supporting portion of the slider.

In the magnetic head slider according to the first aspect, the contact area with the magnetic disk of the sliding protrusion on the inner peripheral side is made larger than the contact area with the magnetic disk of the protrusion on the outer peripheral side, so that the shearing force exerted on the inner-peripheral-side protrusion having a peripheral speed slower than the outer-peripheral-side protrusion can be increased to stabilize movement of the magnetic head slider.

In the magnetic head slider according to the second aspect, the contact areas with magnetic disk of the sliding protrusions disposed on the inner and outer peripheral sides are inversely proportional to the peripheral speeds of the magnetic disk contacting with the protrusions, so that the shearing force exerted on the slider can be balanced to stabilize movement of the magnetic head slider.

In the magnetic head slider according to the third aspect, the interval between the magnetic head element and the inner-peripheral-side sliding protrusion is offset so that the interval is larger than the interval between the magnetic head element and the outer-peripheral-side sliding protrusion, so that the rotation moments about the magnetic head element from the inner- and outer-peripheral-side protrusions having the same contact area can be balanced to stabilize movement of the magnetic head slider.

In the magnetic head slider according to the fourth aspect, the interval between the magnetic head element and the sliding protrusion on the inner peripheral side and the interval between the magnetic head element and the sliding protrusion on the outer peripheral side are inversely proportioned to the peripheral speeds of the magnetic disk contacting with the sliding protrusions, so that the rotation moments about the magnetic head element can be balanced preferably to stabilize movement of the magnetic head slider.

In the magnetic head slider according to the fifth aspect, coarseness of the contact surface with the magnetic disk of the sliding protrusion on the inner peripheral side is made larger than that of the protrusion on the outer peripheral side, so that the shearing forces exerted on both the protrusions can be balanced to stabilize movement of the magnetic head slider.

In the magnetic head slider supporting mechanism according to the sixth aspect, the carriage supports the magnetic head slider through the supporting portion at a position in which the rotation moment produced by the protrusion positioned nearer to the rotation center than the supporting portion of the magnetic head slider is equal to the rotation moment produced by the protrusion positioned farther from the rotation center than the supporting portion of the slider, so that the shearing forces exerted on the magnetic head element and the sliding protrusion during the seeking operation of the magnetic head slider can be balanced to stabilize movement of the magnetic head slider.

BRIEF DESCRIPTION OF THE DRAWINGS

These and other object and technical advantages of the present invention will be readily apparent from the following description of the preferred embodiments of the invention in conjunction with the accompanying drawings, in which.

DETAILED DESCRIPTION OF THE PREFERRED EMBODIMENTS

The present invention is now described in detail with reference to an embodiment.

Figure 15:
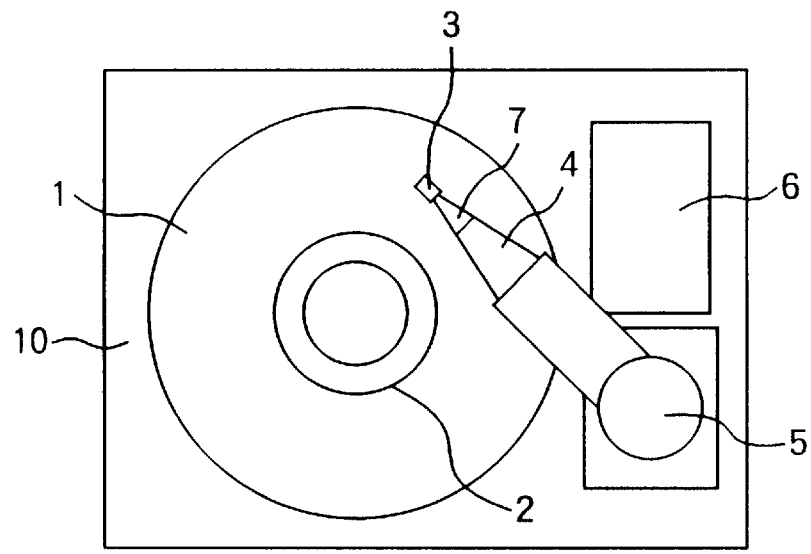
FIG. 15 is a schematic diagram illustrating a magnetic storage apparatus of an embodiment.

Referring to a plan view of FIG. 15, a storage apparatus includes a storage medium 1, a motor 2 for rotating the storage medium, a magnetic head 3 for performing writing/reading of information, a gimbal member 7 and an arm 4 for supporting the magnetic head, an actuator for positioning the magnetic head 3, and an electric circuit 6 for performing information processing and positioning control.

The storage medium 1 includes an aluminum (Al) substrate, a groundwork-forming metal layer of Cr or the like disposed on the aluminum substrate, a magnetic layer of CoCrTa system disposed on the metal layer and having the anisotropy formed in the internal direction perpendicular to the surface, a carbon protection layer disposed on the magnetic layer and having high mechanical abrasion strength and a thickness of about 10 nm, and liquid lubricant applied on the protection layer and having a thickness of about 5 nm. The substrate may be made of silicon or glass. The magnetic layer may be a magnetic layer having the anisotropy in the vertical direction to the layer surface. The lubricant may be solid lubricant layer made of fluoride.

Figures 16A, 16B:
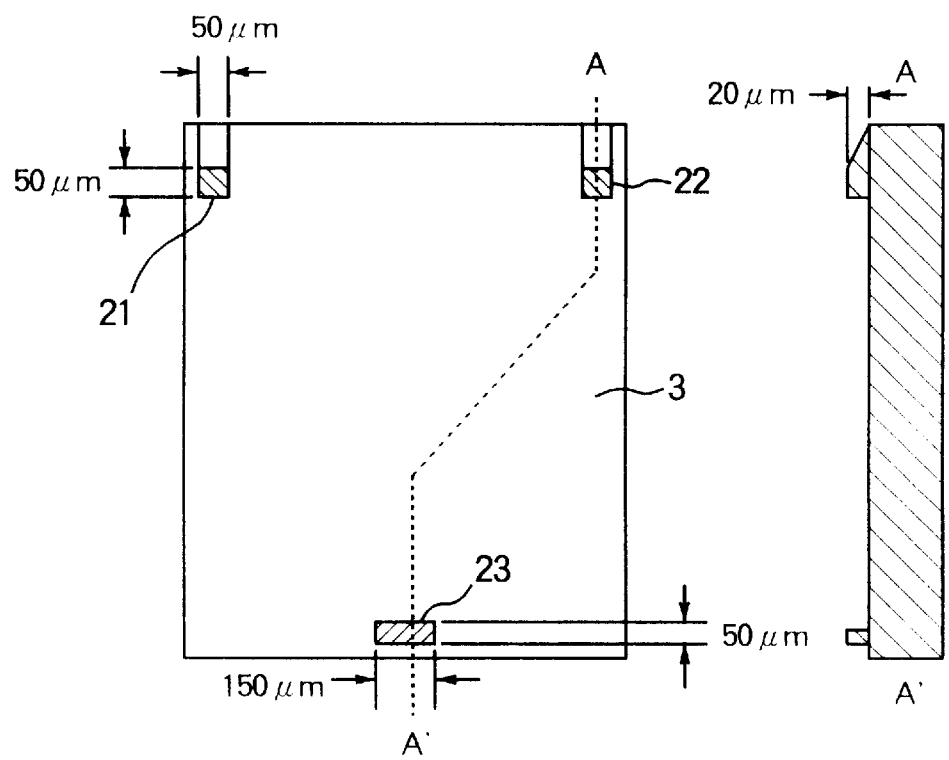
FIGS. 16A and 16B are a plan view and a sectional view showing pads mounted on a magnetic head of another embodiment.

As shown in FIG. 16, three pads 21, 22 and 23 are provided on a sliding surface of the magnetic head 3. In this embodiment, the pads are formed into a square, while the pads may be formed into a circle. The square pads are simple in shape and are apt to be worked. This working uses the ion milling method, the mechanical grinding method and the like. Detailed sizes of the three pads are as shown in FIG. 16. The total area of these pads is 0.0125 mm$^2$. Size of the whole magnetic head is 2 mm×1.6 mm, while this size can be selected arbitrarily in the range of exceeding the pad area. The pad surface is equipped with a protection layer having a thickness of about 10 nm in order to prevent abrasion of the pad surface. The protection layer may be a carbon layer, a diamond-like carbon layer, a silicon oxide layer, a silicon carbide layer or the like.

Figure 17:
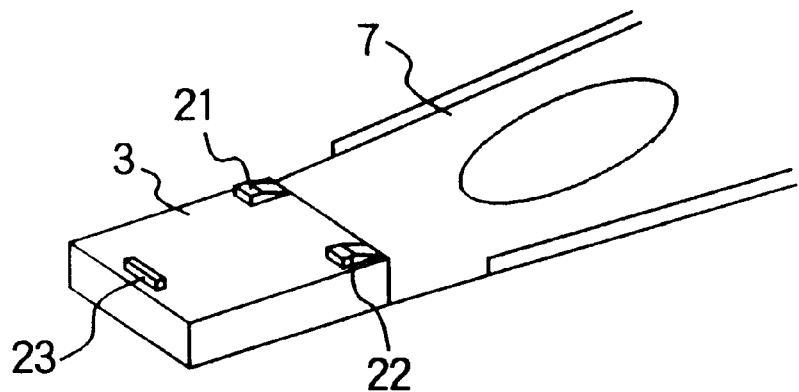
FIG. 17 is a perspective view showing a magnetic head to which a gimbal member is mounted.

Further, as shown in FIG. 17, the magnetic head 3 is attached to the gimbal member 7 so that the two pads 21 and 22 provided in the magnetic head 3 are positioned in the front of the storage medium moved relatively to the magnetic head. In this embodiment, a distance between the pads 21 and 22 is about 1.5 mm. Further, the total of areas of the two pads 21 and 22 in the front position is 0.005 mm$^2$ and an area of the pad 23 in the rear position is 0.0075 mm$^2$. A distance measured from a line connecting the two pads 21 and 22 in the front position to the pad 23 in the rear position is about 1.8 mm. The area of the pads in the rear position is wider than that of the pad in the front area. When this relation is reversed and the pad area in the front position is wider than the pad area in the rear position, there occurs a problem that a variable range of the relative speed is narrow. However, when it is convenient that the variable range of the relative speed is narrow, the pad area in the front position may be widen.

A writing and reading function unit for inputting and outputting information is provided in the pad 23 in the rear position. This function unit may be provided at a rear end of the magnetic head in the same manner as a conventional magnetic head. The magnetic head of the present invention is brought into contact with the medium through lubricant. Accordingly, since abrasion of the pad contacting with the medium is extremely small and any special member and structure are not required, the function unit is made of the same material as that of the flying type magnetic disk apparatus such as high molecular resin film and NiFe system alloy having the soft magnetic characteristics. Accordingly, the contact type magnetic head can be manufactured with the same productivity as the conventional magnetic head. This aspect is different from the one-point contact type (one-pad type) magnetic head tolerating abrasion.

Figure 18:
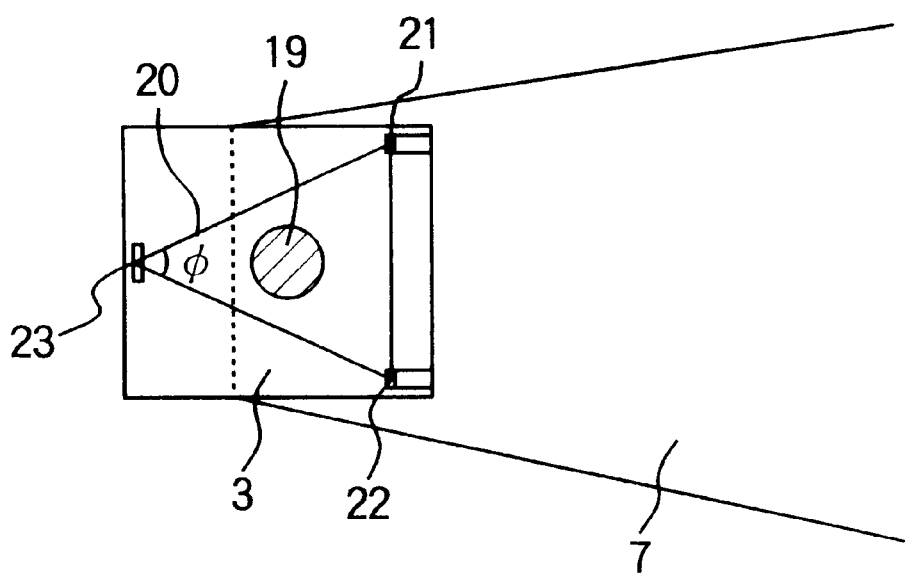
FIG. 18 shows a mounting position of a magnetic head and a gimbal member.

Further, in order to reduce abrasion of the magnetic head greatly, as shown in FIG. 18, the magnetic head 3 is joined to the gimbal member 7 at a position 19 surrounded by a virtual triangle 20 having apexes formed by the three pads 21 to 23 provided on the sliding surface of the magnetic head 3. The gimbal member 7 is supported by the arm and the magnetic head 3 is pressed on the surface of the storage medium by the gimbal member with a load of about 50 mg. In an example where an area of a pad layer is varied, this load can be adjusted in the range from 4 g/cm$^2$ to 400 g/cm$^2$ to obtain the satisfactory storage/reproduction characteristics.

A vertical angle φ of the virtual triangle 20 having the three pads 21, 22 and 23 as apexes thereof is set in the range of 30° to 90°. When the vertical angle φ is set within the range of 30° to 90°, distances among the three pads are separated with spatially satisfactory balance and accordingly a large restoring torque is produced in the state where only one side of the magnetic head abuts against the medium so that the three pads are brought into contact with the surface of the medium stably.

Figure 14A:
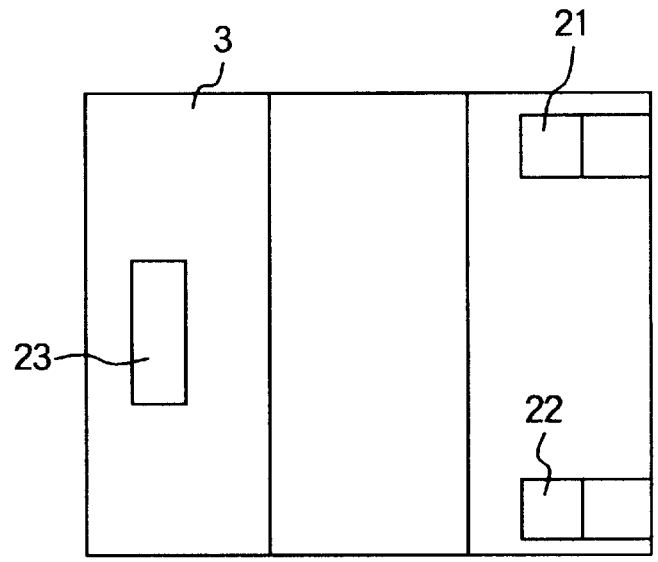
FIGS. 14A and 14B are a plan view and a side view of a magnetic head of another embodiment, respectively.
Figure 14B:
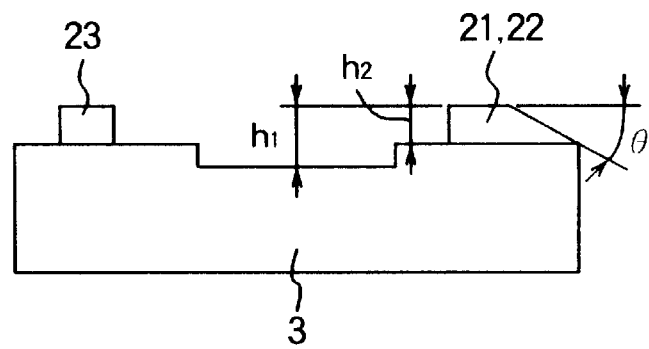
Figure 14C:
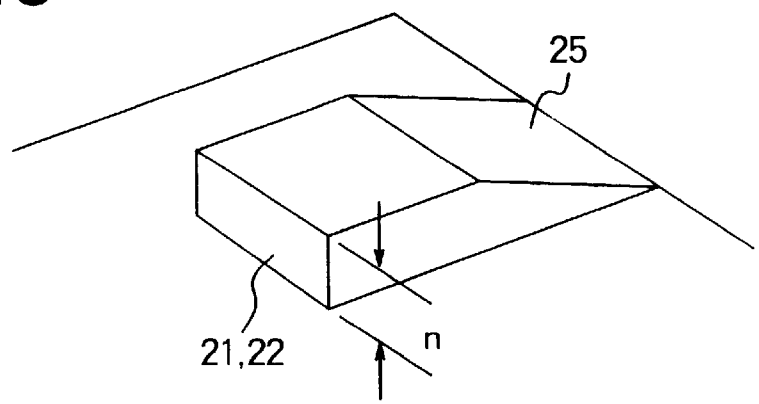
FIG. 14C is a perspective view of a front pad.

Further, as shown in FIGS. 14A, 14B and 14C, a taper 25 is formed in the front of each of the two pads 21 and 22 disposed in the front position. The margin of a taper angle θ is wider than that of the flying type and it is confirmed that any problem does not occur in the range of about 0.05° to 45°.

In addition, when the storage medium is moved (rotated) at a high speed, a floating or flying force acts on the sliding surface of the magnetic head and a stable contact state cannot be maintained. In order to solve this problem, the height h of the pads from the sliding surface is set to 20 μm as shown in FIG. 14C in the embodiment. In order to avoid floating or flying of the magnetic head and secure the mechanical strength, it is necessary to set the height of the pads to the range of 5 μm to 100 μm.

The height of the pads is limited to the above range and in the embodiment, a recess is formed in part of the area surrounded by the three pads as shown in FIGS. 14A and 14B, and a height $h_1$ from the surface of the recess to the surface of the pads and a height $h_2$ of other area have the relation of $h_1 > h_2$. Actually, the difference of the height is about 5 μm ($h_1 - h_2$). When the storage medium is moved, a negative pressure is produced between the medium and the magnetic head due to the difference in height, so that the magnetic head can be pressed onto the medium. The negative pressure produced in this time is estimated as about 100 mg. This pressure act on the magnetic head only when the storage medium is moved. Accordingly, by setting the magnetic head in a position separated slightly from the medium, the magnetic head can be loaded only when the medium is rotated and the negative pressure is produced. This unction is named self-load function.

Figure 1:
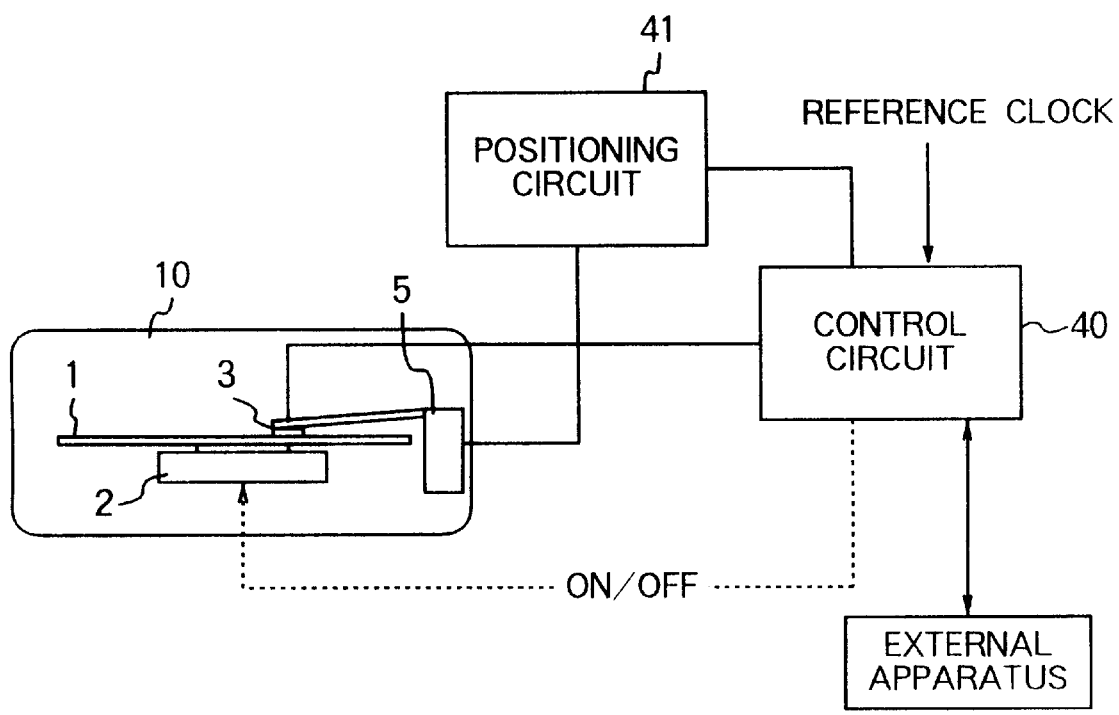
FIG. 1 is a schematic diagram illustrating a conventional magnetic recording apparatus.
Figure 2A:
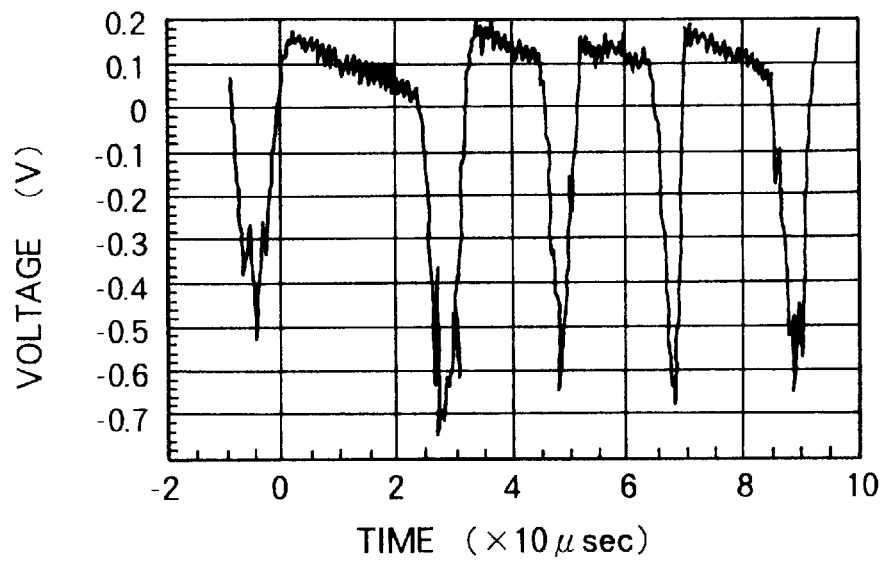
FIGS. 2A and 2B show reproduced signal outputs of a magnetic head.
Figure 2B:
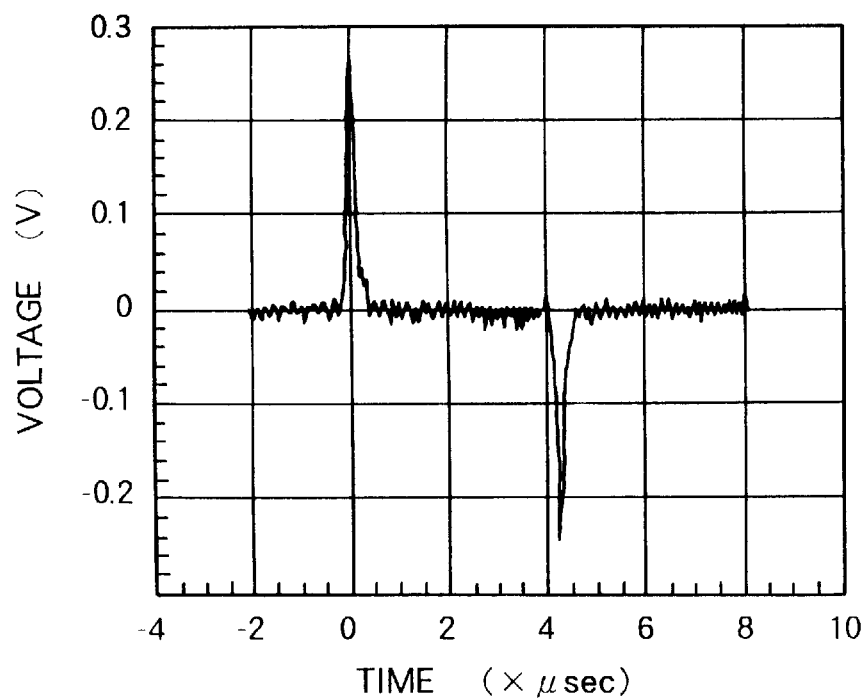
Figure 3:
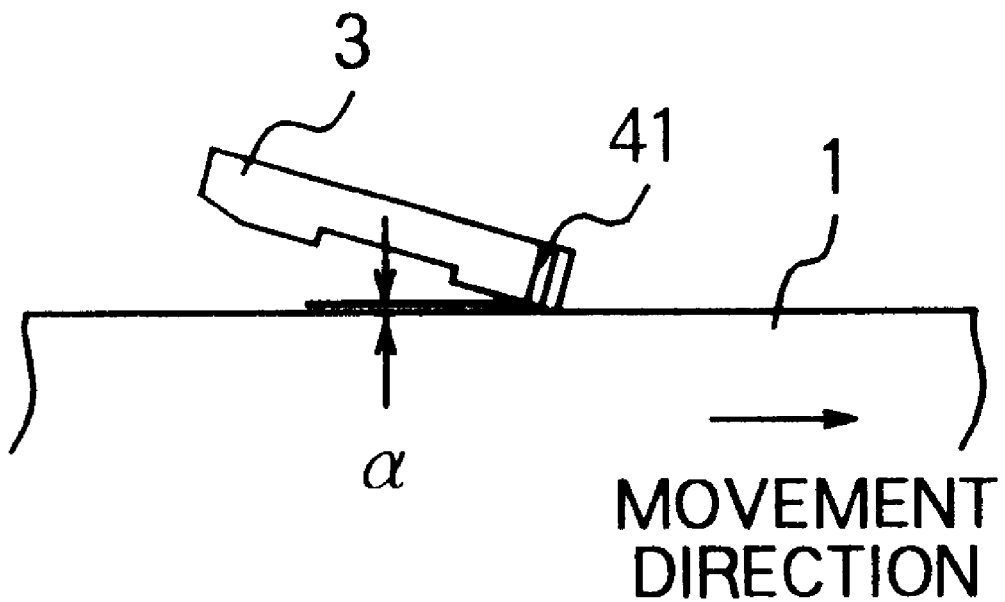
FIG. 3 illustrates operation of a conventional magnetic head.
Figure 4:
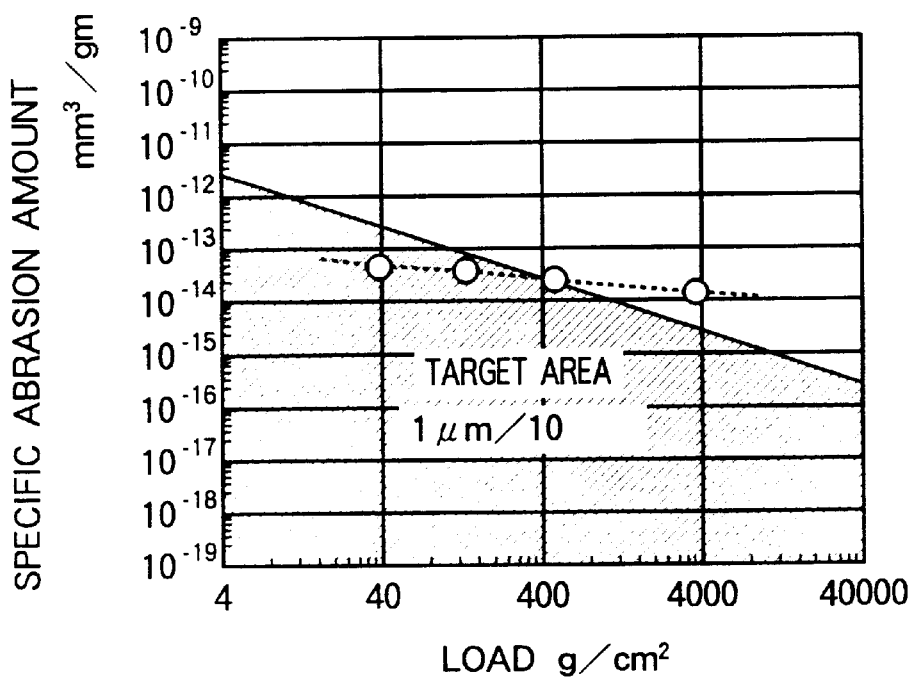
FIG. 4 shows a relation of a load and a specific abrasion amount.
Figure 5:
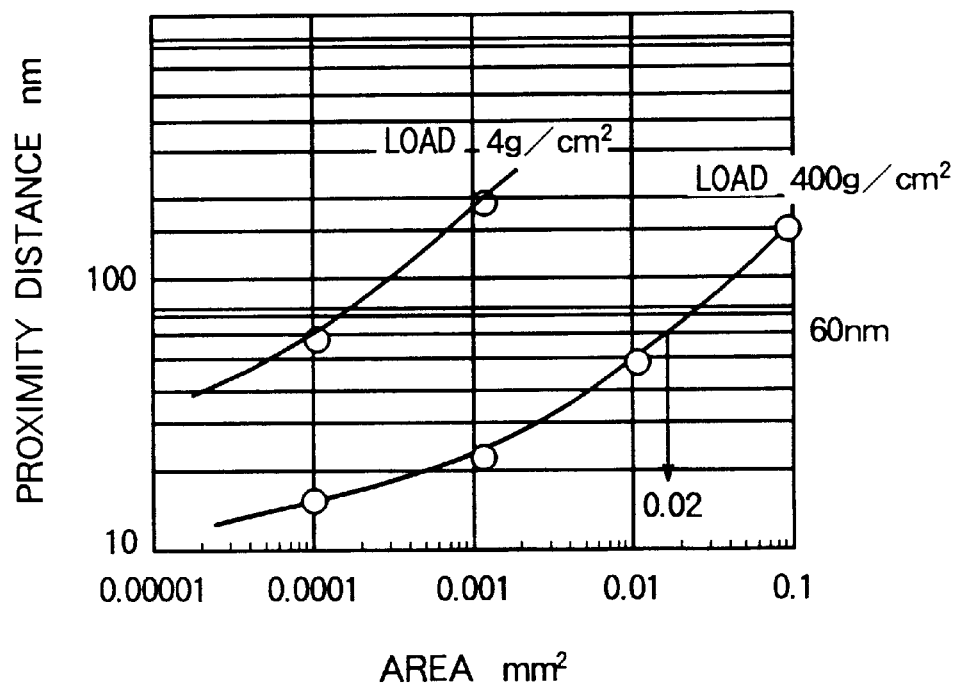
FIG. 5 shows a relation of a pad area and a proximity distance.
Figure 6:
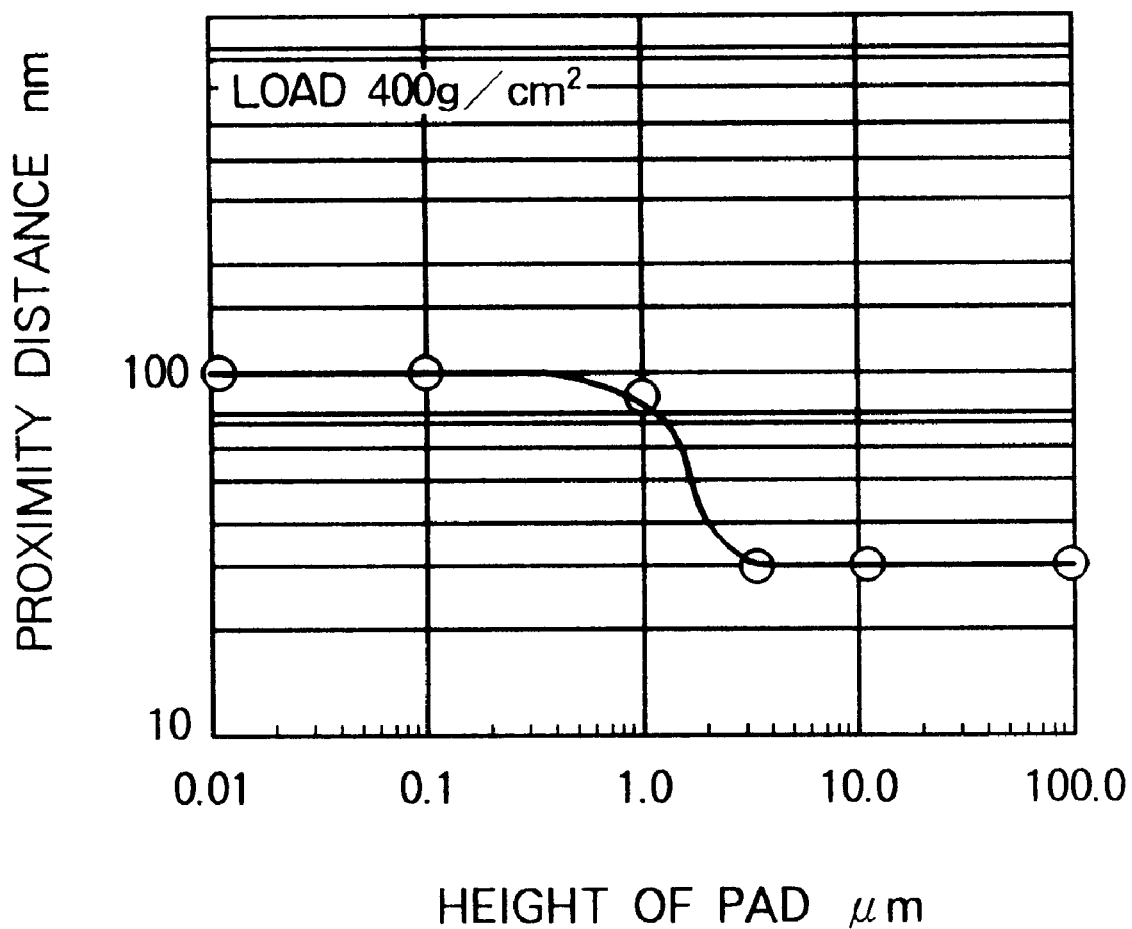
FIG. 6 shows a relation of the height of a pad and a proximity distance.
Figures 7A, 7B:
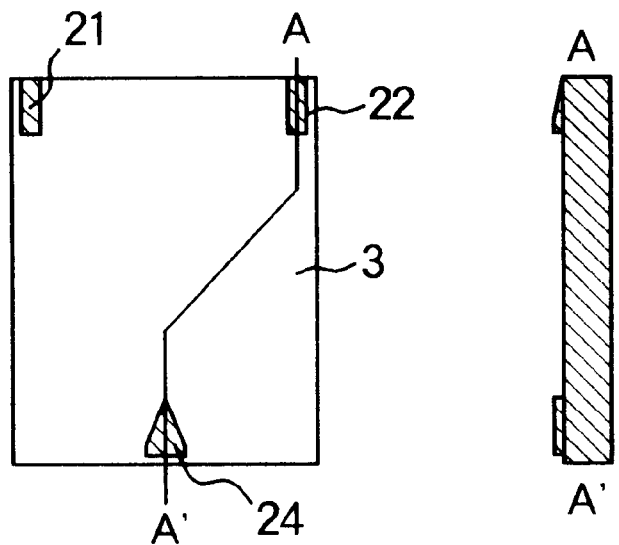
FIGS. 7A and 7B are a schematic diagram and a sectional view showing pads mounted on a magnetic head according to an embodiment of the present invention, respectively.
Figures 8A, 8B:
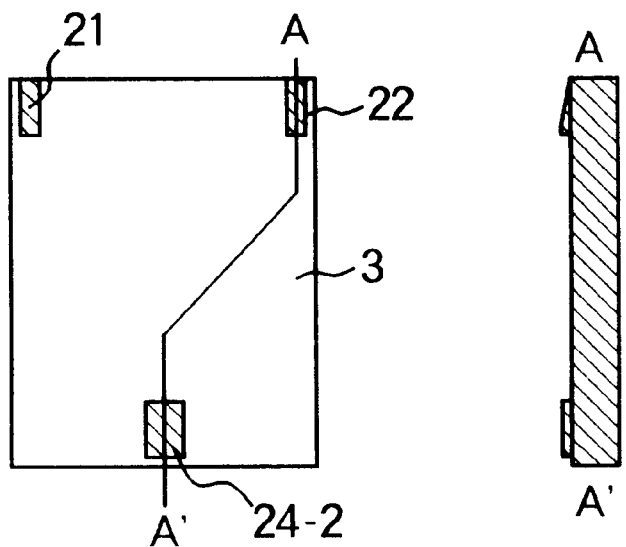
FIGS. 8A and 8B are a schematic diagram and a sectional view showing pads mounted on a magnetic head according to another embodiment of the present invention, respectively.
Figures 9A, 9B:
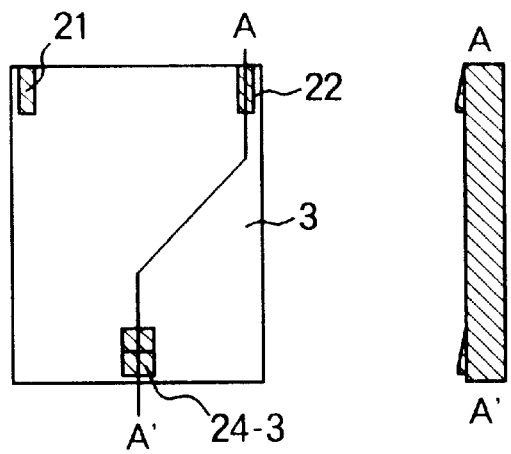
FIGS. 9A and 9B are a schematic diagram and a sectional view showing pads mounted on a magnetic head according to another embodiment of the present invention, respectively.
Figures 10A, 10B, 10C:
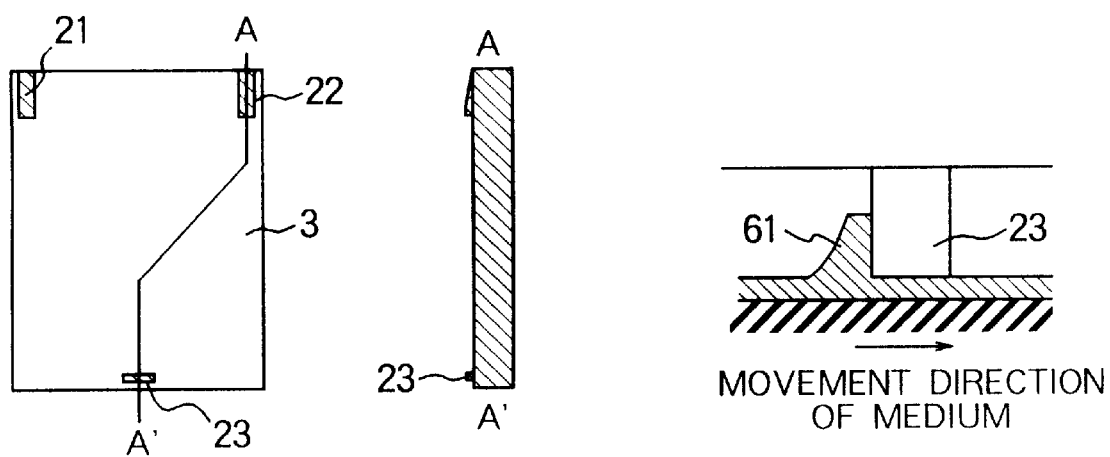
FIGS. 10A and 10B are a schematic diagram and a sectional view showing pads mounted on a magnetic head for comparison, respectively.
FIG. 10C illustrates operation of a pad in respect to lubricant.
Figure 11:
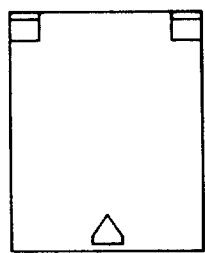
FIGS. 11 to 13 show a relation of yaw angle and normalized output.
Figure 11:
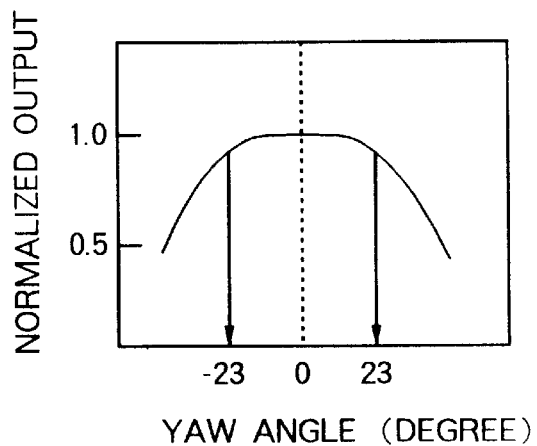
Figure 12:
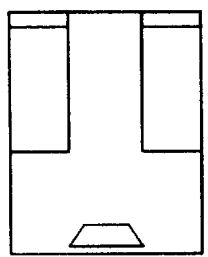
Figure 12:
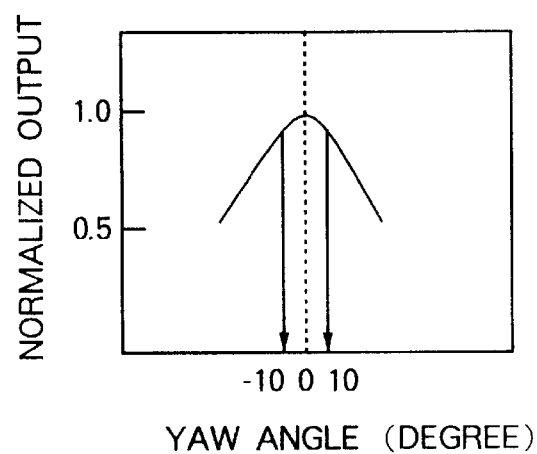
Figure 13:
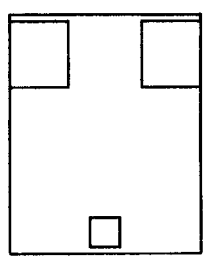
Figure 13:
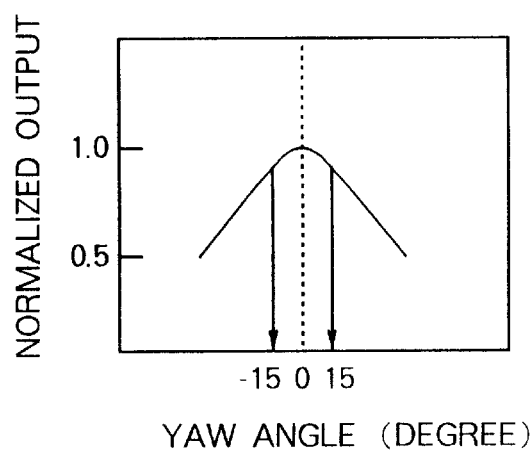

As shown in FIGS. 7A and 7B, the pad in the ear position has a width of 150 µm and a height of 300 µm. This size is an example and even if the degree of the acuity is varied, there is no large difference in this size in implementing this invention. Further, the pad in the embodiment is symmetrical to the central axis of the head. This configuration is suitable when the rotational direction of the recording medium and the central axis are coincident with each other in the case where the magnetic head is positioned at the middle point of the seeking range. When not coincident, the shape of a portion sharpened in respect to a straight line directing toward the rotational direction of the recording medium at the middle point of the seeking range is adapted to be made symmetrical to thereby obtain the satisfactory sliding result.

The negative pressure is maximized in the range that the relation of $h_1 > h_2$ is maintained and $(h_1 - h_2) \approx 3 \sim 10$ µm is satisfied. The area of $h_2$ can be set from about 0.5 mm$^2$ to 1 mm$^2$ to thereby produce the negative pressure of about 100 mg. In FIG. 14A, the recess is formed into a belt over the whole width of the magnetic head, while the recess may be formed in the sliding surface in seclusion from the periphery.

The magnetic head having the pads structured above can be supported by the gimbal member 7 and the arm 4 with a load of 4 g/cm$^2$ to 400 g/cm$^2$ to thereby brought the magnetic head into contact with the storage medium stably. It is confirmed that this contact state is maintained stably in the above condition range about the areas of the pads, the joined position of the gimbal, the height of the pads and the contact load without dependence on the rotational number of the storage medium. Since the input/output function unit provided in the magnetic head is always brought into contact with the storage medium, transmission of information by means of the magnetic field between the magnetic head and the storage medium can be performed with high efficiency and high accuracy. Accordingly, the high-density magnetic information of 10 Gb/in$_2$ class can be written in the storage medium and can be read out stably.

Figure 19:
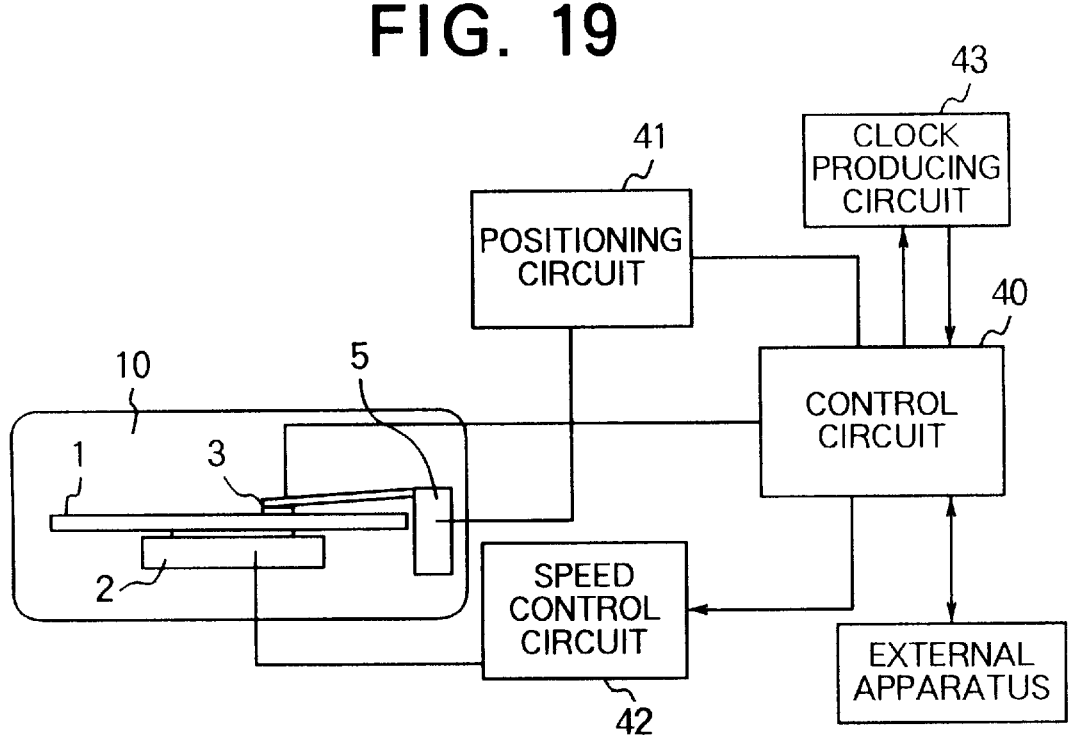
FIG. 19 is a schematic diagram illustrating a magnetic storage apparatus of another embodiment.

Referring now to FIG. 19, an embodiment of the magnetic storage apparatus in which the relative speed of the storage medium and the magnetic head is varied is described. The relative speed of the storage medium 1 and the magnetic head 3 is varied by means of the rotational number of the motor 2 directly coupled with the storage medium. The rotational number of the motor is controlled by using a speed control circuit 42 which functions in response to a signal from the control circuit 40. It is necessary that a clock for actuating the positioning circuit is produced on the basis of the relative speed. In the embodiment, a magnetic domain pattern having an equal phase period is previously written in part of the storage medium 1 and the clock corresponding to the relative speed is produced on the basis of the period of the detection signal obtained from this pattern. In order to produce this signal, a clock producing circuit 43 is connected to the control circuit 40.

The clock producing circuit 43 has a function that a reading signal is inputted at a predetermined timing and a predetermined oscillation frequency is determined from a period of this reading signal to be produced. More particularly, the clock producing circuit 43 includes a function for receiving a signal from the control circuit 40 to input the reading signal and detecting the frequency of the signal, a function for converting the frequency information into a voltage, a function for converting the voltage information into digital information and preserving the information until a next reading time, a function for converting the digital information into analog information again, and a function for inputting the analog information to a voltage-to-frequency converting circuit (VCO) to produce a fixed frequency.

Accordingly, when the peripheral speed of the storage medium is varied, the period of the reading signal is varied and the frequency of the clock produced by the clock producing circuit 43 is also varied in response to the variation of the frequency. Alternatively, the clock can be produced by directly connecting a tachometer to a shaft of the motor. The positioning function is actuated in synchronism with the clock to perform positioning of the magnetic head in the same manner as in the prior art.

Operational effects obtained by varying the rotational number of the medium are now described. Effects by reduction of the rotational number is first described. The magnetic head and the storage medium are moved relatively to each other and accordingly when a writing frequency is maintained fixed, the high density magnetic information can be written by reducing the rotational number. More particularly, when the rotational number is reduced to 1000 rpm or less, the high density magnetic memorization of 200 KFCI or more can be attained with the writing frequency of 50 MHz. It is necessary to generate a strong magnetic field from the magnetic head upon writing and accordingly the magnetic head is required to be supplied with a large current. Heretofore, it is considered that a large current cannot flow with a high frequency of 50 MHz or more due to characteristics of an IC circuit. Hence, when the rotational number is fixed, the storage density is limited by the writing frequency. According to the present invention, the high density memorization can be attained within the range of the conventional IC performance without limitation by the writing frequency.

Conversely, when high-speed reading is required, the rotational speed of the storage medium is increased to 4000 rpm. Thus, the high data transfer speed of 5 MB/sec is attained. This is attained by being capable of performing reading utilizing a high-speed IC circuit since a current of a reading signal is small as compared with a current upon writing. A conventional magnetic disk apparatus cannot realize the high-speed reading due to limitation of a writing frequency and restriction that the floating or flying height of the magnetic head is maintained fixed. In the present invention, the limitations can be removed by adoption of the contact type magnetic head.

Another utilization example of varying the rotational number of the storage medium is now described. In this example, the relative speed is varied in accordance with a kind of information to be inputted and outputted. In the case of image information, any problem does not occurs even if an error is produced in input/output information to a certain degree. The image information is required to be inputted and outputted at a high speed. The present invention can easily cope with the input/output of data having such property by increasing the relative speed of the medium and the magnetic head. Conversely, when it is necessary to input and output data having high reliability such as data of a computer, the relative speed can be reduced. In this case, the reading function unit is constituted by a magnetoresistive effect device in which a detection signal is reduced even if the relative speed is reduced. The conventional flying type magnetic disk cannot vary accuracy (reliability) of a signal in accordance with a kind of data. However, according to the present invention, different signal quality can be treated by a single apparatus.

Figure 20:
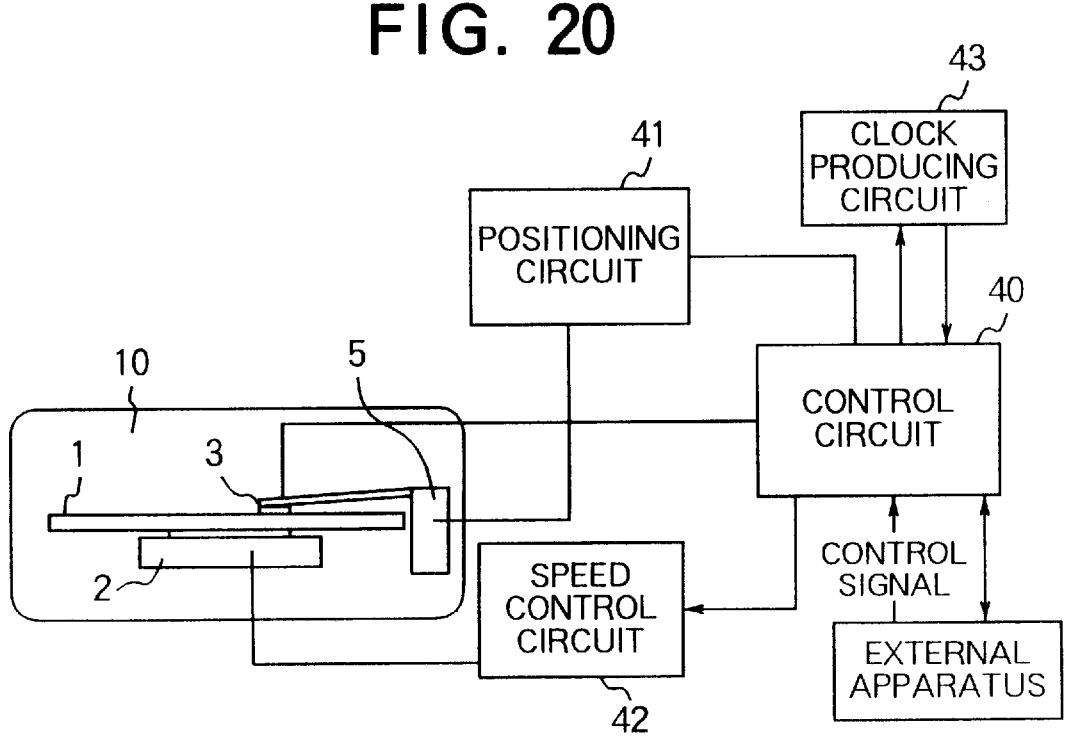
FIG. 20 is a schematic diagram illustrating a magnetic storage apparatus of another embodiment.

Variation of the rotational speed of the storage medium can be determined by the control circuit 40 provided in the apparatus as shown in FIG. 19, while alternatively as shown in FIG. 20 a control signal can be received from the external apparatus to select an oscillation frequency by the clock producing apparatus arbitrarily. A difference between the circuits of FIGS. 20 and 19 resides in that a part of the function of the control circuit 40 is provided in the external apparatus in the case of the circuit configuration of FIG. 20. Since the reference clock can be varied by the signal from the external apparatus arbitrarily with this function, the density of storage information can be varied arbitrarily even if the peripheral speed is fixed. Accordingly, the storage density can be selected arbitrarily in accordance with the reliability (allowable error rate) of the storage information. Since the reliability (allowable error rate) of the storage information is to be judged by the external apparatus which handles information and cannot be judged by the magnetic storage apparatus which merely stores information, the function capable of varying the reference clock by means of the signal from the external apparatus is required as shown in FIG. 20 when the memorization speed is varied in accordance with a kind of information.

According to the present invention, the magnetic head which is stably brought into contact with the storage medium can be manufactured with the same production method as the conventional method. According to the contact type magnetic head, since the function unit which performs the input/output operation can be brought nearest to the storage medium stably, the function unit can transmit magnetic information with high efficiency and high accuracy and can attain the high-density memorization of 10 Gb/in$^2$ to the storage medium.

Further, according to the present invention, the magnetic storage apparatus capable of varying the rotational number of the storage medium arbitrarily. Accordingly, the high-density memorization can be attained within the range of the conventional IC performance without using any special elements. In addition, input/output of information having different signal quality can be treated by a single apparatus.

Figure 21A:
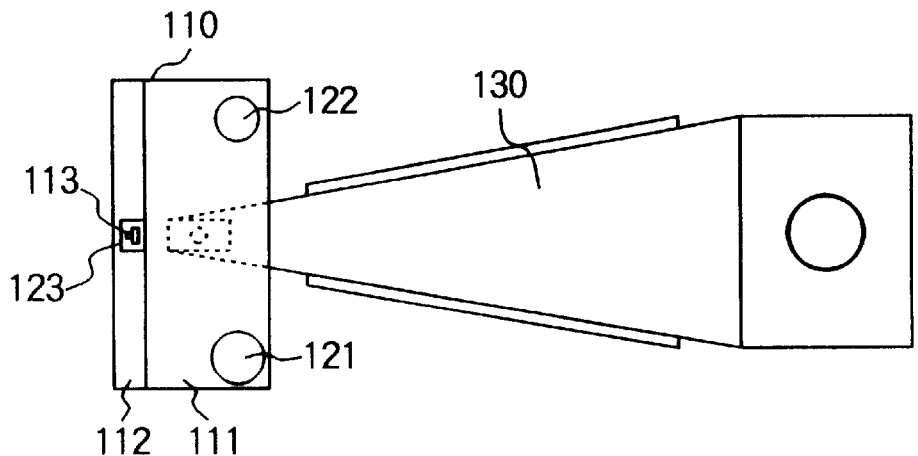
FIGS. 21A and 21B are a plan view and a side view of a magnetic head slider according to another embodiment, respectively.
Figure 21B:
Figure 22:
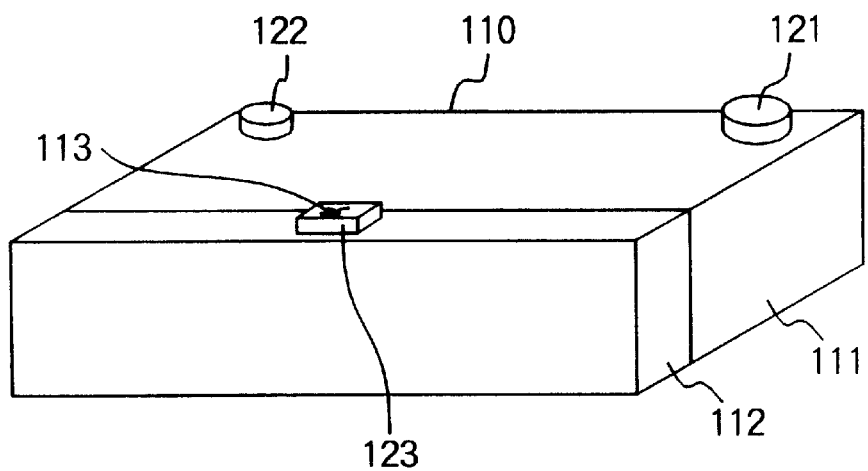
FIG. 22 is a perspective view showing a magnetic head slider according to the embodiment.
Figure 23:
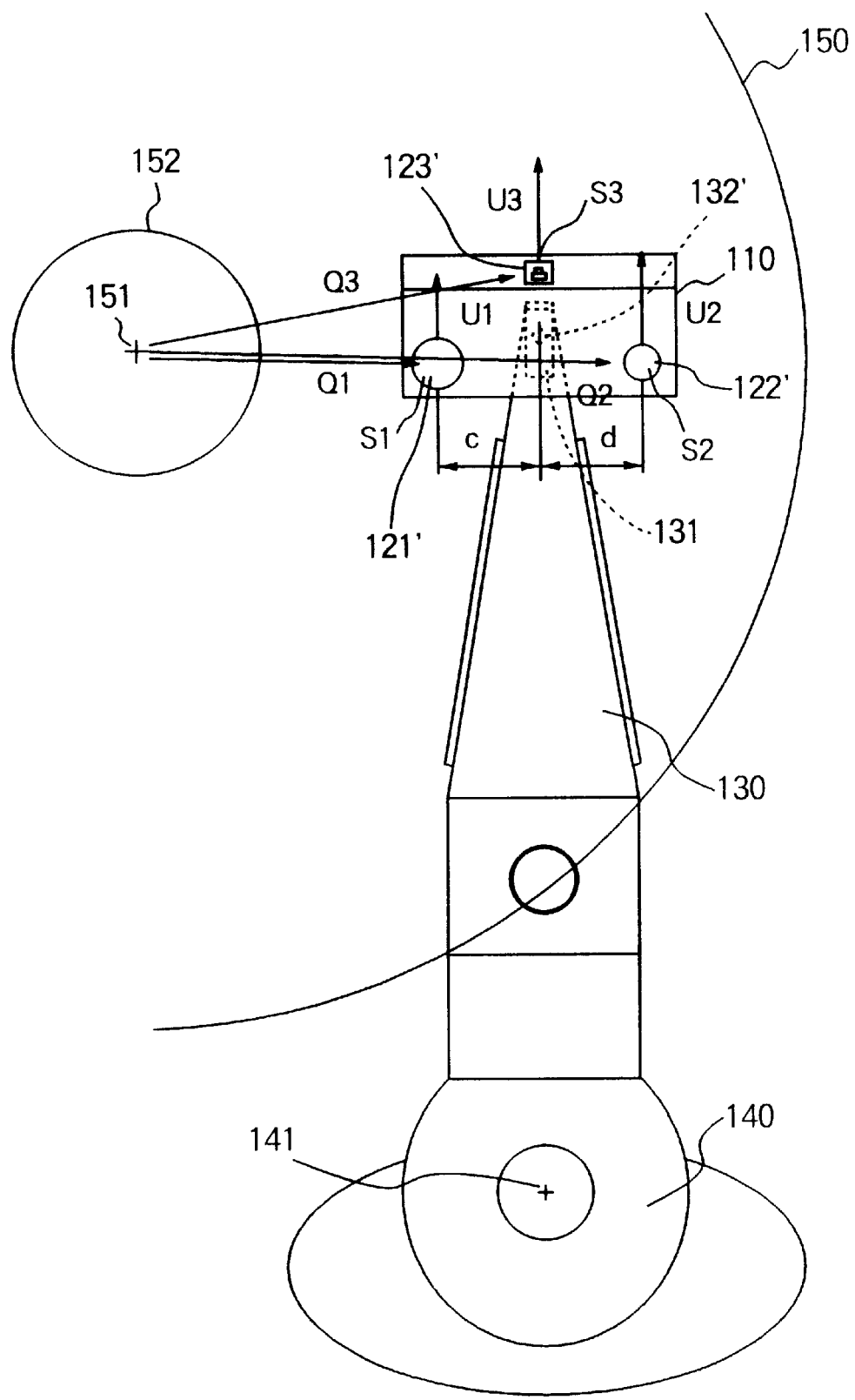
FIG. 23 is a diagram illustrating the operational principle of a magnetic head slider of another embodiment.

FIG. 21A is a plan view of a magnetic head slider according to another embodiment of the present invention, FIG. 21B is a side view of FIG. 21A, FIG. 22 is a perspective view of the magnetic head slider, and FIG. 23 is a diagram illustrating the moment on a magnetic disk of the magnetic head slider mounted in a load arm.

As shown in FIGS. 21A, 21B and 22, the magnetic head slider 110 of the embodiment includes a thin film element forming portion 112 extending in the radial direction of the magnetic disk and having a magnetic head element protrusion 123 and a thin film element portion 113 disposed in the middle of the forming portion 112, and protrusions 122 and 121 disposed in the outer peripheral direction and the inner peripheral direction of the magnetic disk, respectively, and formed on an opposite surface to the magnetic disk by means of etching work, and is supported resiliently to a load arm 130 by means of a gimbal 131 and a pivot 132 abutting against the center of gravity 114 of the slider 110. The magnetic head element protrusion 123 and the thin film element portion 113 constitute a magnetic head element for recording and reproducing data from the magnetic disk.

In the magnetic head slider 110 according to the embodiment, a contact area of the protrusion 121 in the inner peripheral direction is larger than that of the protrusion 122 on the side of the outer periphery. More particularly, when the contact areas of both the protrusions 121 and 122 are equal to each other, the shearing force of the protrusion on the side of the outer periphery is larger than that of the protrusion on the side of the inner periphery due to a difference in the peripheral speed of the magnetic disk contacting with the protrusion, so that the rotation moment occurs and the stability is lacking in a posture of the magnetic head slider. Accordingly, in the embodiment, the contact area of the protrusion 121 in the inner peripheral direction is larger than that of the protrusion on the side of the outer periphery, so that the shearing force is equalized.

Further, as in the embodiment shown in FIG. 16, it is desirable that the area of the protrusion 123 is larger than the total area of the protrusions 121 and 122. In addition, it is desirable that the protrusions 121, 122 and 123 satisfy the above-mentioned conditions. The same thing is also applied to the following embodiments.

Further, when it is assumed that the longitudinal direction of the load arm 130 is set to the length direction of the slider and the movement direction in the seeking operation of the load arm is set to a width direction of the slider, it is preferable that a size of the magnetic head slider 110 is set to have a length of about 0.5 mm, a width of about 1 mm, a thickness of about 0.4 mm and a height of the protrusions of 6 $\mu$m. The protrusions are formed by using the etching method, while other mechanical working may be used. Further, the pivot is not required and there is no problem if any member having the function of the pivot is used.

Referring now to FIG. 23, the shearing force of the protrusions described above is described. FIG. 23 illustrates the load arm 130 supporting the magnetic head slider 110 of the embodiment and disposed on the surface of a rotating magnetic disk 150 by means of a carriage 140. In FIG. 23, in order to facilitate the understanding, a voice coil motor for rotating the carriage 140 is omitted and FIG. 23 is a view in the case where the interior is viewed from the above of the magnetic disk surface.

In FIG. 23, when portions on surfaces which are parallel to the magnetic disk and on which the protrusion 121 on the inner periphery side and the protrusion 122 on the side of the outer periphery are projected are defined as an inner-peripheral-side protrusion projected surface 121' and an outer-peripheral-side protrusion projected surface 122', respectively, and a rotational center of the magnetic disk 150 on the same surface is defined as a point 151, description is made by defining a contact area of the protrusion 121 with the magnetic. disk as Si, a distance from the rotational center 151 of the magnetic disk to the protrusion projected surface 121' as Q1, and the rotational speed of the magnetic disk at a position of the protrusion projected surface 121' as U1 and also defining the distances and rotational speeds Q2, U2, Q3 and U3 for the protrusion 122 and the magnetic head element protrusion 123, respectively, in the same manner.

Generally, the shearing force F acting between two substances or objects being moved relatively to each other is calculated by the above-mentioned expression 1 when a coefficient of viscosity of lubricant provided between the two objects is $\mu$, the relative speed between the two objects is U, a distance between the two objects is Z and an area of a surface is S. When the expression 1 is applied to the protrusions 121 to 123, the shearing force F1 of the protrusion 121 and the magnetic disk, the shearing force F2 of the protrusion 122 and the magnetic disk, and the shearing force F3 of the magnetic head element protrusion 123 and the magnetic disk are expressed by the following expressions 2 to 4:

$$F1 = \mu \cdot \frac{dU1}{dZ} \cdot S1 \qquad (2)$$

$$F2 = \mu \cdot \frac{dU2}{dZ} \cdot S2 \qquad (3)$$

$$F3 = \mu \cdot \frac{dU3}{dZ} \cdot S3 \qquad (4)$$

When a point on the surface which is parallel to the magnetic disk and on which the pivot 132 contacting with the slider 110 is projected is defined as a pivot projected point 132' and a ratio of a distance from the pivot projected point 132 to the inner-peripheral-side protrusion projected surface 121' and a distance from the pivot projected point 132' to the outer-peripheral-side protrusion projected surface 122' is defined as c:d, the balance of the rotation moments about the pivot can be expressed by the following expression:

$$F1 \cdot c = F2 \cdot d \qquad (5)$$

When the ratio is set to c:d=1:1 (when the pivot is positioned in the middle of both the protrusions), the following expression 6 is obtained.

$$F1 = F2 \qquad (6)$$

When the expressions 2 and 3 are substituted in the expression 6 and are arranged, the expression 7 is obtained and it is understood that the rotation moments produced in both the protrusions having the same distance between the pivot and the respective protrusions are balanced when a ratio of the contact areas with the magnetic disk of the inner-peripheral-side protrusion 121 and the outer-peripheral-side protrusion 122 is set to a ratio of inverse numbers of the speeds at the positions of the inner-peripheral-side protrusion 121 and the outer-peripheral-side protrusion 122.

$$\frac{S1}{S2} = \frac{U2}{U1} \qquad (7)$$

Further, the peripheral speed ratio corresponds to a ratio of radii from the magnetic disk and accordingly when this relation is used, the expression 8 is obtained and it is understood that the ratio of inverse numbers of the radii can be also used.

Accordingly, the magnetic head slider of the embodiment shown in FIG. 21 can balance the rotation moments produced in both the protrusions to reduce vibration to thereby slide on the magnetic disk stably by inversely proportioning the ratio of contact areas of both the protrusions having the same distance between the pivot and the respective protrusions with the radius of the magnetic disk contacting therewith.

$$\frac{S1}{S2} = \frac{U2}{U1} = \frac{Q2}{Q1} \qquad (8)$$

Further, when the areas of contact surfaces with the magnetic disk of the inner-peripheral-side protrusion 121 and the outer-peripheral-side protrusion 122 are set to be equal to each other, S1=S2 is applied to the expression 5, the expression 9 is obtained, and it is understood that it is convenient that a ratio of a distance from the pivot projected point 132' the inner-peripheral-side protrusion projected surface 121' and a distance from the pivot projected point 132' to the outer-peripheral-side protrusion projected surface 122' is designed to be a ratio of inverse numbers of the speeds at the respective positions of the inner-peripheral-side protrusion 121 and the outer-peripheral-side protrusion 122. In order to balance the rotation moments produced in both the protrusions having the same contact area, a ratio of distances between both the protrusions and the pivot projected point may be inversely proportioned and this embodiment will be described later.

$$\frac{c}{d} = \frac{U2}{U1} \qquad (9)$$

Further, the principle has been described with the position having a yaw angle of 0 degree, while when the area of the protrusion 123 of the magnetic head element is smaller than that of the protrusions 122, 127 disposed in the inner and outer periphery or when a distance between the pivot 132 and the protrusion 123 of the magnetic head element is smaller than that of between the pivot 132 and the inner-peripheral-side protrusion 127 or between the pivot 132 and the outer-peripheral-side protrusion 122 even if a yaw angle is formed, it is a range of the degree that it can be neglected.

Figure 24:
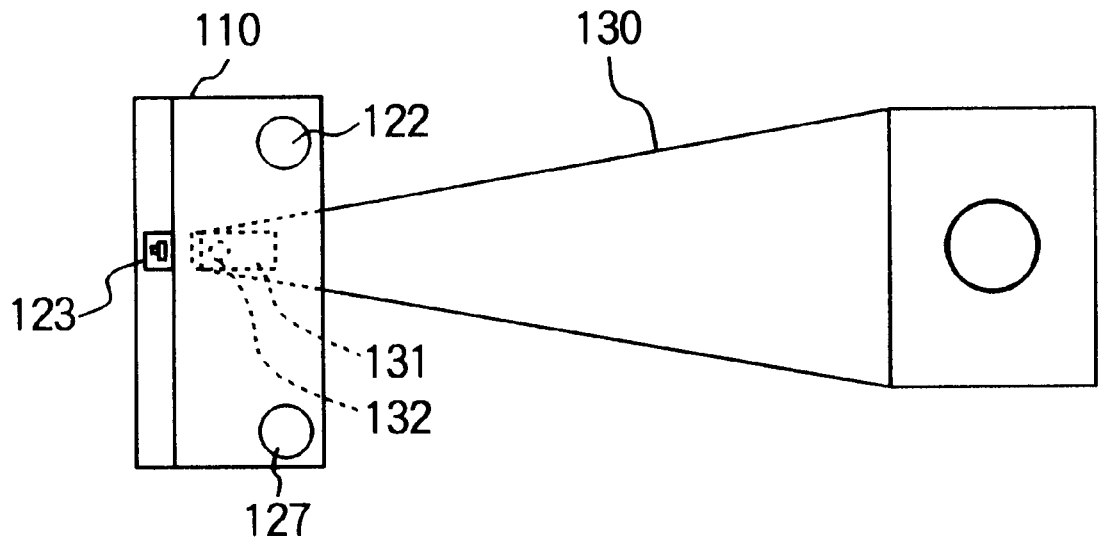
FIG. 24 is a plan view of a magnetic head slider according to another embodiment.

FIG. 24 is a plan view illustrating a magnetic head slider according to another embodiment of the present invention. In the magnetic head slider according to the embodiment, the contact surface areas with the magnetic disk of the inner-peripheral-side protrusion 127 and the outer-peripheral-side protrusion 122 are made equal to each other on the basis of the principle shown in the expression 9 and a ratio of a distance from the pivot 132 to the inner-peripheral-side protrusion 127 and a distance from the pivot 132 to the outer-peripheral-side protrusion 122 is set to a ratio of inverse numbers of radii at respective positions of the inner-peripheral-side protrusion 127 and the outer-peripheral-side protrusion 122 as viewed from the magnetic disk surface. Further, the magnetic head element protrusion 123 is disposed in the position of the pivot.

In the magnetic head slide of the embodiment, since the position of the magnetic head element protrusion 123 is shifted by the same amount as the offset amount of the pivot, influence of the rotation moment by the magnetic head element protrusion 123 can be neglected.

Figure 25:
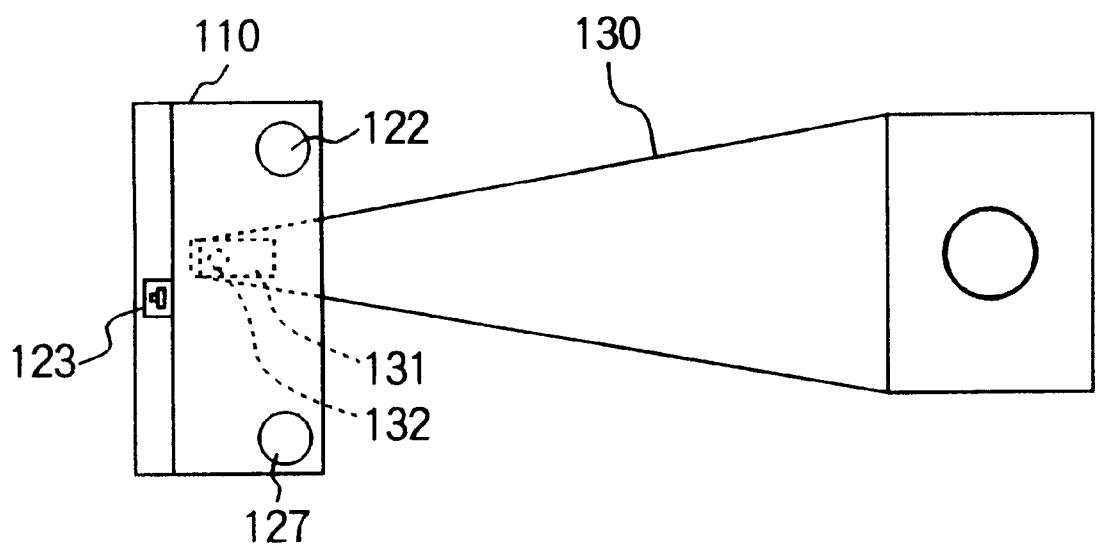
FIG. 25 is a plan view showing a magnetic head slider according to another embodiment.

FIG. 25 is a plan view illustrating a magnetic head slider according to another embodiment of the present invention. In the magnetic head slider according to the embodiment, in the same manner as the embodiment shown in FIG. 24, the contact surface areas with the magnetic disk of the inner-peripheral-side protrusion 127 and the outer-peripheral-side protrusion 122 are made equal to each other on the basis of the principle shown in the expression 9 and a ratio of a distance from the pivot 132 to the inner-peripheral-side protrusion 127 and a distance from the pivot 132 to the outer-peripheral-side protrusion 122 is set to a ratio of inverse numbers of radii at respective positions of the inner-peripheral-side protrusion 127 and the outer-peripheral-side protrusion 122 as viewed from the magnetic disk surface. Further, The magnetic head element protrusion 123 is disposed in the middle in the width direction of the slider.

Accordingly, in the embodiment, the rotation moment is produced due to the shearing force acting on the magnetic head element protrusion 123 and a distance of the pivot 132, while the rotation moment can be neglected when the area of the magnetic head element protrusion 123 is smaller than the protrusions 122 and 127 disposed in the inner and outer peripheries, respectively, and the distance between the pivot 132 and the magnetic head element protrusion 123 is shorter than the distance between the pivot 132 and the inner-peripheral-side protrusion 127 or the distance between the pivot 132 and the outer-peripheral-side protrusion 122. Actually, whether the position of the magnetic head element protrusion 123 is also required to be offset depends on the size and the offset amount of the magnetic head element protrusion 123 and accordingly when it cannot be neglected, it is necessary to perform calculation in consideration of this influence.

Figure 26:
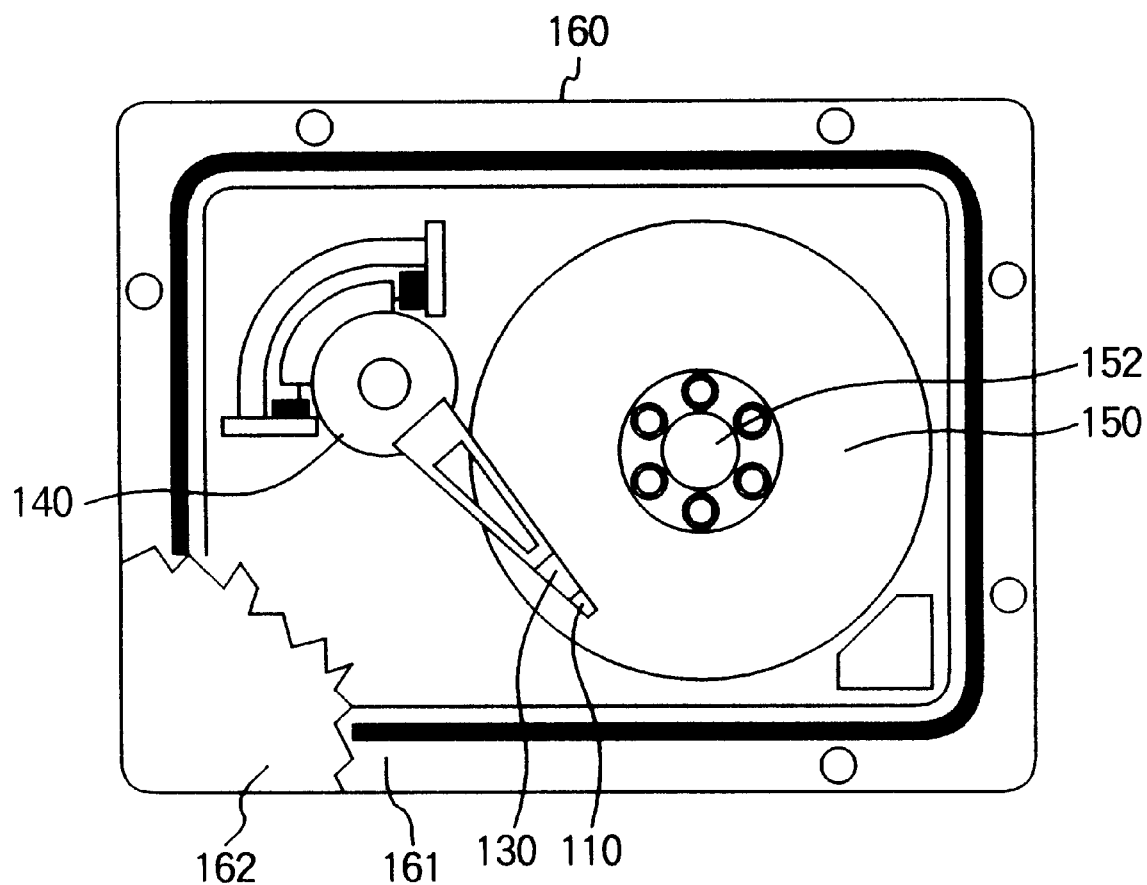
FIG. 26 illustrates a magnetic disk apparatus to which a magnetic head slider according to another embodiment is mounted.

FIG. 26 illustrates a magnetic disk apparatus 160 having the above magnetic head slider mounted therein. The magnetic disk apparatus 160 includes the magnetic head slider 110 which is supported by the load arm 130 and which is circularly moved on the magnetic disk supported by a spindle 152 rotated by a motor (not shown) of a base 160 by the carriage 140 and a driving mechanism and this structure is covered hermetically by a cover 162. This magnetic disk apparatus is not greatly different from the magnetic head slider having the flying type magnetic head slider mounted therein in external appearance.

When the magnetic head slider of the present invention having an interval between the inner-peripheral-side protrusion 121 and the outer-peripheral-side protrusion 122 equal to 0.9 mm by way of example is mounted in the magnetic disk apparatus of 1.8 inches and the magnetic head slider 110 is positioned in the innermost cylinder position, the ratio of speeds in the respective positions of the inner-peripheral-side protrusion 121 and the outer-peripheral-side protrusion 122 is caused to correspond to the radius ratio, so that a value of the ratio is 12/12.9=0.93 and an area ratio of the respective magnetic disk opposing surfaces of the inner-peripheral-side protrusion 121 and the outer-peripheral-side protrusion 122 is 1/0.93=1.075. In the embodiment, the inner-peripheral-side protrusion 121 is formed of a circular cylinder (the height of the protrusion is 6 pm) having a diameter of 30 $\mu$m and the inner-peripheral-side protrusion 121 is formed of a circular cylinder (the height of the protrusion is 6 $\mu$m) having a diameter of 29 $\mu$m. (The area ratio at this time is 1.07.) This area ratio acts more greatly when the disk size is reduced and the inner peripheral of the disk is used as the seeking range.

Figure 27:
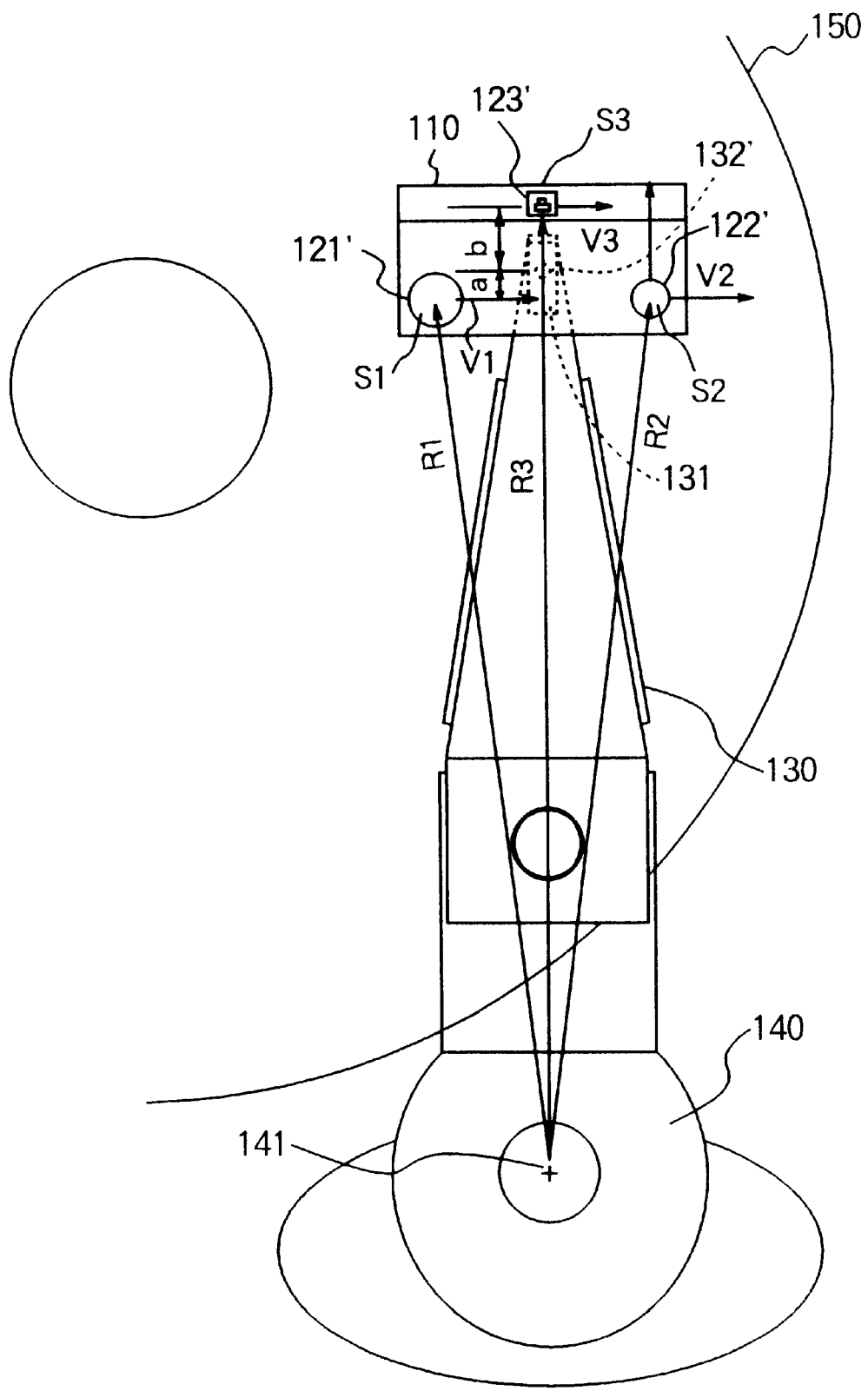
FIG. 27 illustrates a magnetic head slider of another embodiment and the operational principle thereof.

FIG. 27 is a diagram illustrating a principle of a magnetic head slider according to another embodiment of the present invention taking the stability upon the seeking operation into consideration. FIG. 27 is a view in the case where the interior is viewed from the above of the magnetic disk surface in order to explain the principle of the embodiment. When portions on surfaces which are parallel to the magnetic disk 150 and on which the inner-peripheral-side protrusion 121 and the outer-peripheral-side protrusion 122 are projected are defined as an inner-peripheral-side protrusion projected surface 121' and an outer-peripheral-side protrusion projected surface 122', respectively, and a rotational center of the carriage on the same surface is defined as a carriage rotational center 141, a contact area of the protrusion 121 with the magnetic disk is defined as S1, a distance from the carriage rotational center 141 to the protrusion projected surface 121' as R1, and the moving speed upon the seeking operation of the magnetic disk slider at a position of the protrusion 121 as V1, and the distances and rotational speeds R2, V2, R3 and V3 are also defined for the protrusion 122 and the magnetic head element protrusion 123, respectively, in the same manner. At this time, V1 and V2 must be vertical to vectors of R1 and R2 exactly, while since the width of the slider is sufficiently small as compared with the distance from the seeking center 141 as shown in FIG. 26, there is no problem if the direction of the speed is the same as V3.

The magnetic head slider of the embodiment obtains the shearing forces given by the expressions 10 to 12 rather than the expression 1 as the shearing forces Fs newly exerted under the respective protrusions upon the seeking operation.

$$FS1 = \mu \cdot \frac{dV1}{dZ} \cdot S1 \qquad (10)$$

$$FS2 = \mu \cdot \frac{dV2}{dZ} \cdot S2 \qquad (11)$$

$$FS3 = \mu \cdot \frac{dV3}{dZ} \cdot S3 \qquad (12)$$

When the pivot projected point 132' formed by projecting the pivot 132 on a surface parallel to the magnetic disk is connected to the carriage rotational center 141 existing on the same surface and a ratio of a distance between the pivot projected point 132' and the protrusion positioned nearer to the carriage rotational center 141 than the pivot projected point 132' and a distance between the pivot projected point 132' and the protrusion positioned farther from the carriage rotational center 141 than the pivot projected point 132' is set to be a:b as shown in FIG. 27, the relation of the expression 13 must be satisfied in order to dispose the pivot 132 in a position in which the rotation moment of the magnetic head slider in the internal direction perpendicular to the surface of the magnetic disk produced by the protrusion positioned near from the carriage rotational center 141 than the pivot projected point 132' and the rotation moment of the magnetic head slider in the internal direction perpendicular to the surface of the magnetic disk produced by the protrusion positioned farther than the pivot projected point 132' from the rotational center 141 are equal to each other.

$$FS1 \cdot a + FS2 \cdot a = FS3 \cdot b \qquad (13)$$

When projected points of the protrusions 121 and 122 and the magnetic head element protrusion 123 on the surface parallel to the magnetic disk are defined as protrusion projected surfaces 121' and 122' and a head element protrusion projected point 123', respectively and a distance R1 from the carriage rotational center 141 to the protrusion projected surface 121' on the same surface is equal to a distance R2 from the carriage rotational center 141 to the protrusion projected surface 122' on the same surface, the expression 13 is expressed as the expression 14 from R2=R2, V2=V2, and V3=(R3/R1)×V1.

$$(S1 + S2)a = S3\frac{R3}{R1}b \quad (14)$$

Accordingly, when a ratio of a distance between the pivot projected point 132' and the protrusion positioned nearer to the rotational center 141 than the pivot projected point 132' and a distance between the pivot projected point 132' and the protrusion positioned farther from the rotational center 141 than the pivot projected point 132' is set to be a:b as shown in FIG. 27, the relation of a/b is expressed by the expression 15 and when the length of the slider is sufficiently shorter than the load arm, it can be regarded as R2/R1≈1 and accordingly a/b can be expressed as the expression 16.

$$\frac{a}{b} = \frac{S3}{S1+S2}\frac{R3}{R1} \quad (15)$$

$$\frac{a}{b} = \frac{S3}{S1+S2}\frac{R3}{R1} \approx \frac{S3}{S1+S2} \quad (16)$$

Accordingly, by designing the magnetic head slider so that the relation of the opposing areas S2+S3 to the magnetic disk of the protrusions positioned nearer to the rotational center 141 than the pivot projected point 132' and the opposing area S3 to the magnetic disk of the protrusion positioned farther from the rotational center 141 than the pivot projected point 132' is proportioned inversely, the rotation moment upon the seeking operation can be reduced.

For example, when a ratio of areas of the protrusions is set to S1:S2:S3=1.07:1:1, the rotation moment upon the seeking operation can be reduced by setting a/b to a/b=S3/(S1+S2)=1/(1+1.07)=0.483.

Figure 28A:
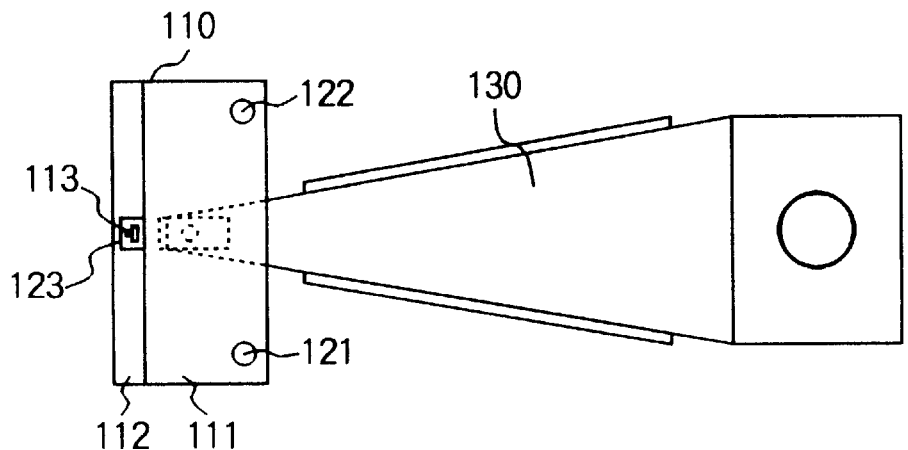
FIGS. 28A and 28B are a plan view and a side view of a magnetic head slider according to another embodiment, respectively.
Figure 28B:
Figure 28C:
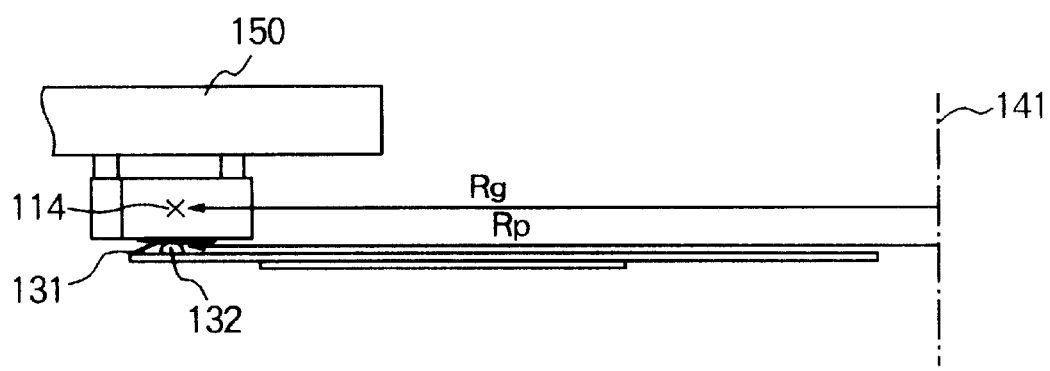
FIG. 28C shows the slider which is pressed on a magnetic disk.

FIGS. 28A to 28C show a magnetic head slider supporting mechanism including a magnetic head slider according to another embodiment of the present invention. The magnetic head slider includes the magnetic head slider supporting mechanism in which when a distance from the rotation center 141 of the carriage to the pivot projected point is Rp and a distance from the rotation center of the carriage to the projected point on the magnetic disk of the center of gravity 114 of the slider is Rg, Rp=Rg is satisfied, so that the rotation moment of the magnetic head slider produced in the internal direction perpendicular to the surface of the magnetic disk about the pivot 132 upon acceleration and deceleration of the seeking operation is reduced to zero.

The center of gravity 114 of the slider is positioned in the center of the slider in the longitudinal direction thereof in FIG. 28 and accordingly when a ratio of the opposing areas of the protrusions to the magnetic disk is a/b=S3/(S1+S2)=1 in the expression 16, the rotation moment is 0. Hence, the ratio of areas of the protrusions is set to S1:S2:S3=1.07:1:2.07.

Figure 29:
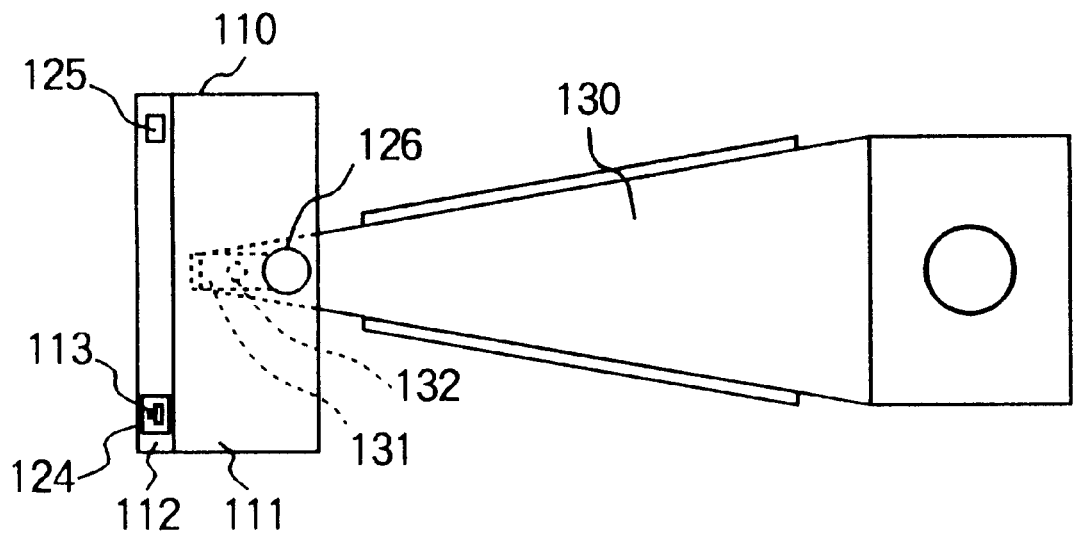
FIG. 29 is a plan view showing a magnetic head slider according to another embodiment.

FIG. 29 shows a magnetic head slider according to another embodiment of the present invention. In FIG. 29, the magnetic head element protrusion is not formed in the center of the magnetic head slider, and the magnetic head slider of FIG. 29 includes a magnetic head element protrusion 124 formed on the inner peripheral side of the magnetic head slider with respect to the magnetic head, a sliding protrusion 125 formed on the outer peripheral side of the magnetic head slider with respect to the magnetic head, and a sliding protrusion 126 positioned on the opposite side of the protrusions 124 and 125 in respect to the pivot 132 so that the pivot 132 is positioned between the sliding protrusion 126 and the protrusions 124 and 125. In the embodiment, in order to balance the shearing forces of the inner- and outer-peripheral side protrusions, the area of the opposing surface to the magnetic disk of the magnetic head element protrusion 124 on the inner peripheral side is formed to be larger than the contact area of the opposing area to the magnetic disk of the sliding protrusion 125 on the outer peripheral side.

Further, as an improved example of the embodiment, it is considered that the magnetic head element protrusion 124 is formed on the outer peripheral side and the magnetic head element protrusion 125 is formed on the inter peripheral side or the magnetic head element protrusions 124 are formed on both of the inner and outer peripheral sides, while it is necessary that the area of the opposing surface to the magnetic disk of the inner-peripheral-side protrusions 124 is larger than the area of the opposing surface to the magnetic disk of the outer-peripheral-side protrusion 125 or the distance between the protrusions and the pivot is adjusted to balance the shearing force. In this manner, in the magnetic head slider according to the embodiment, the magnetic head slider can be disposed in an arbitrary protrusion.

Figure 30:
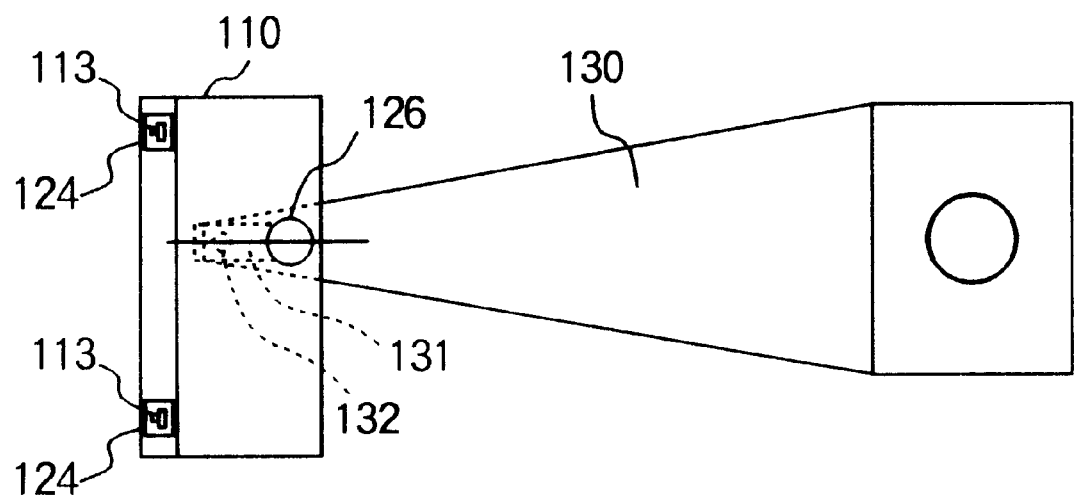
FIG. 30 is a plan view showing a magnetic head slider according to another embodiment.

FIG. 30 shows a magnetic head slider according to another embodiment of the present invention. In the embodiment, the pivot 132 and the sliding protrusion 126 are offset on the outer peripheral side and the thin film element portion 113 is mounted in both of the inner- and outer-peripheral-side protrusions 124 instead of the configuration in which the area of the opposing surface to the magnetic disk of the inner-peripheral-side protrusion is equal to the area of the opposing surface to the magnetic disk of the outer-peripheral-side protrusion in the embodiment of FIG. 29.

The magnetic head slider can balance the shearing forces to prevent vibration by the offset even if the contact areas of the inner- and outer-peripheral-side protrusions 124 are the same and the number of magnetic head can be increased to improve the high density recording and the recording and reproducing speed by parallel operation.

Figure 31:
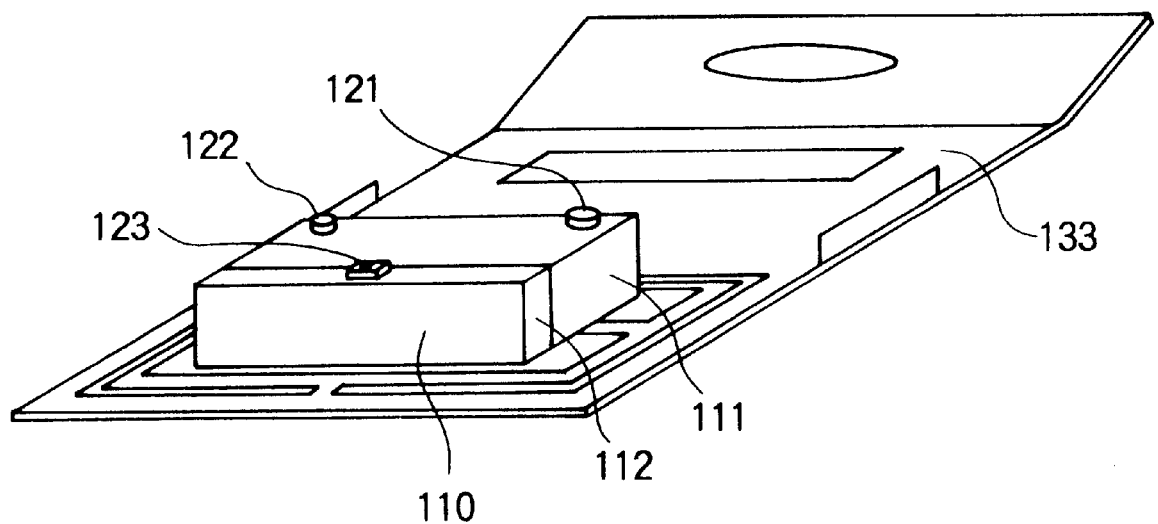
FIG. 31 is a perspective view of a magnetic head slider according to another embodiment.

FIG. 31 shows a magnetic head slider and a supporting mechanism according to another embodiment of the present invention. The embodiment is combined with a substantially laminar and resilient load arm 133 having no pivot. The embodiment includes the magnetic head slider 110 having the magnetic head element protrusion 123 having the thin film element portion in the same manner as the above embodiment, the protrusion 122 disposed on the outer peripheral side of the magnetic disk, the protrusion 121 disposed on the outer peripheral side and having a contact area larger than that of the protrusion 122, and the load arm 133 for supporting the back of the slider 110 resiliently to be able to follow in the rolling and pitch direction by a notch.

The magnetic head slider according to the embodiment can suppress rotation within the mounting surface of the slider even with the load arm having no pivot by balancing the shearing forces of the protrusions 121 and 122.

In the embodiments, in order to reduce the rotation moment in the internal direction perpendicular to the surface of the magnetic disk about the supporting point of the magnetic head slider, the contact area of the inner-peripheral-side protrusion with the magnetic disk is made larger or the pivot is offset to the outer peripheral side, while alternatively there are also considered other methods such as a method of changing coarseness of the contact surfaces of the protrusions with the magnetic disk to reduce the rotation moment, a method of using the spattering method to change material of the contact surfaces of the protrusions with the magnetic disk to adjust the shearing forces, and the like. An example thereof is now described with reference to FIG. 32.

Figure 32:
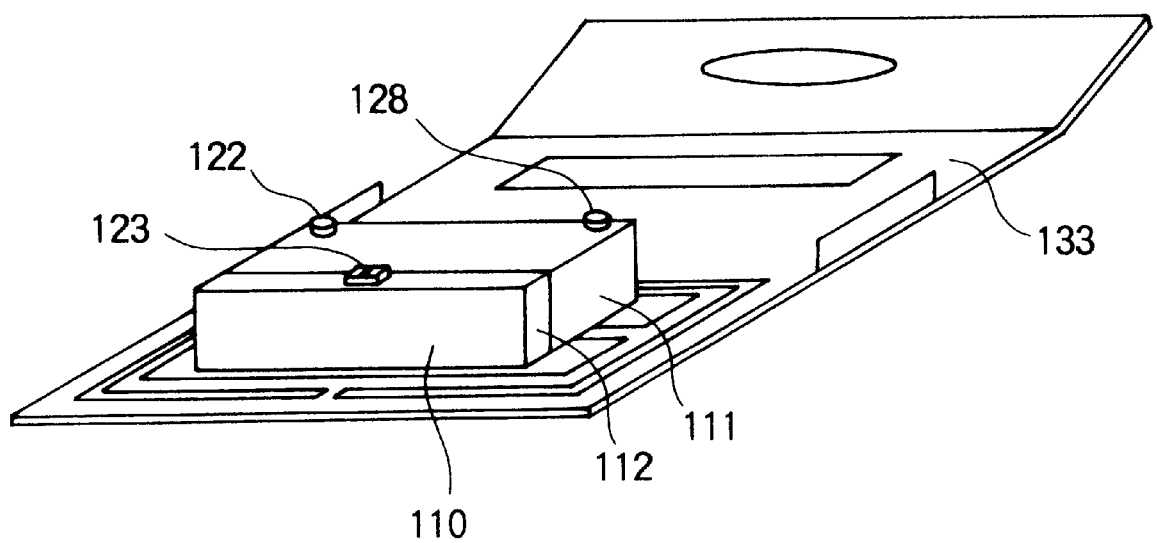
FIG. 32 is a perspective view of a magnetic head slider according to another embodiment.

The magnetic head slider 110 shown in FIG. 32 is disposed on the same load arm 133 as the embodiment and includes an inner-peripheral-side protrusion 128 and an outer-peripheral-side protrusion 122 having an equal contact area and a magnetic head element protrusion 123. Coarseness of the surface of the inner-peripheral-side protrusion 128 brought into contact with the magnetic disk is larger than that of the surface of the outer-peripheral-side protrusion 122 brought into contact with the magnetic disk.

As described above, the magnetic head slider according to the embodiment can adjust the coarseness of the surfaces of the protrusions 122 and 128 to a value whereby the shearing force balances to thereby suppress occurrence of the rotation moment.

In the embodiments described above, the shape of the opposing surface to the magnetic disk of the protrusions formed at the opposing surface to the magnetic disk of the magnetic head slider is formed into a circle or a rectangle, while the present invention is not limited thereto and the shape may be elliptic or polygonal.

Further, the present invention can be also expressed as the following aspects.

<Aspect 1>

A magnetic head slider which is moved relatively to a magnetic disk to which the magnetic head slider is mounted, comprises two sliding protrusions and one magnetic head element protrusion or one sliding protrusion and two magnetic head element protrusions disposed on an opposing surface to the magnetic disk.

When the three protrusions, a slider supporting point disposed in a magnetic head slider supporting mechanism for supporting the slider and a rotation center of a carriage for moving the magnetic head slider supporting mechanism are projected on a surface parallel to the magnetic disk, one of the protrusions is positioned on a line connecting the slider supporting point and the rotation center of the carriage and two remaining protrusions are positioned so that the line connecting the slider supporting point and the rotation center of the carriage is positioned between the two remaining protrusions.

In order to reduce the rotation moment produced when the magnetic head slider is rotated in the internal direction perpendicular to the magnetic disk about the slider supporting point provided in the magnetic head slider supporting mechanism for supporting the slider by the shearing force acting between the magnetic head and the three protrusions contacting the magnetic head, when the magnetic head slider is disposed on the magnetic disk being rotated, a contact area with the magnetic disk of the protrusion on the side of the inner periphery of the disk, of the two protrusions positioned so that the line connecting the slider supporting point and the rotation center of the carriage is positioned between the two protrusions is larger than a contact area of the protrusion on the side of the outer periphery of the disk.

<Aspect 2>

In the magnetic head slider of the aspect 1, in order to reduce the rotation moment produced when the magnetic head slider is rotated in the internal direction perpendicular to the magnetic disk about the slider supporting point provided in the magnetic head slider supporting mechanism for supporting the slider by the shearing force acting between the magnetic head and the three protrusions contacting the magnetic head, when the contact area of the surface of the protrusion on the inner peripheral side of the disk contacting the magnetic disk is made larger than that of the protrusion on the outer peripheral side of the disk, a ratio of the areas of the protrusions is inversely proportioned to a ratio of speeds in the peripheral direction of the disk at radial positions under the protrusions.

<Aspect 3>

A magnetic head slider supporting mechanism provided with a magnetic head slider which is moved relatively to a magnetic disk to which the magnetic head slider is mounted, supports the magnetic head slider including two sliding protrusions and one magnetic head element protrusion or one sliding protrusion and two magnetic head element protrusions disposed on an opposing surface to the magnetic disk.

When the three protrusions, a slider supporting point disposed in the magnetic head slider supporting mechanism for supporting the slider and a rotation center of a carriage for moving the magnetic head slider supporting mechanism are projected on a surface parallel to the magnetic disk, one of the protrusions is positioned on a line connecting the slider supporting point and the rotation center of the carriage and two remaining protrusions are positioned so that the line connecting the slider supporting point and the rotation center of the carriage is positioned between the two remaining protrusions.

In order to reduce the rotation moment produced when the magnetic head slider is rotated in the internal direction perpendicular to the magnetic disk about the slider supporting point provided in the magnetic head slider supporting mechanism for supporting the slider by the shearing force acting between the magnetic head and the three protrusions contacting the magnetic head, when the magnetic head slider is disposed on the magnetic disk being rotated, the slider supporting point is positioned so that a line connecting the slider supporting point and the rotation center of the carriage is offset to the outer periphery of the disk from the center of the two protrusions positioned so that the line is positioned between the two protrusions.

<Aspect 4>

In the magnetic head slider supporting mechanism of the aspect 3, the offset amount of the slider supporting point to the outer peripheral side of the disk is set so that a ratio of a distance from the slider supporting point to the inner-peripheral-side protrusion and a distance from the slider supporting point to the outer-peripheral-side protrusion is inversely proportioned to a ratio of speeds in the peripheral direction of the disk at radial positions under the protrusions.

<Aspect 5>

A magnetic head slider supporting mechanism provided with a magnetic head slider which is moved relatively to a magnetic disk to which the magnetic head slider is mounted, supports the magnetic head slider including two sliding protrusions and one magnetic head element protrusion or one sliding protrusion and two magnetic head element protrusions disposed on an opposing surface to the magnetic disk.

In order to reduce the rotation moment produced when the magnetic head slider is rotated in the internal direction perpendicular to the magnetic disk about the slider supporting point provided in the magnetic head slider supporting mechanism for supporting the slider by the shearing force acting between the magnetic head and the three protrusions contacting the magnetic head, and in order to remove influence of shearing force in a seeking direction added newly during the moving operation (seeking operation) of the magnetic head slider in the case where the magnetic head slider being sliding at a certain radial position of the rotating magnetic disk is moved to a different radial position, when the three protrusions, a slider supporting point disposed in a magnetic head slider supporting mechanism for supporting the slider and a rotation center of a carriage for moving the magnetic head slider supporting mechanism are projected on a surface parallel to the magnetic disk, the slider supporting point is disposed so that a rotation moment produced by the protrusion positioned nearer to the rotation center than the sliding supporting point is equal to a rotation moment produced by the protrusion positioned farther from the rotation center than the sliding supporting point.

<Aspect 6>

In the magnetic head slider supporting mechanism of the aspect 5, when projected on the plane parallel to the magnetic disk, the slider supporting point is positioned so that a sum of the respective products obtained by multiplying areas of the protrusions positioned nearer to the rotation center of the carriage than a projected point of the slider supporting point by a distance to the rotation center of the carriage is equal to a sum of the respective products obtained by multiplying areas of the protrusions positioned farther from the rotation center than the projected point of the slider supporting point by a distance to the rotation center.

<Aspect 7>

In the magnetic head slider supporting mechanism of the aspect 5, when the force of inertia acts on the center of gravity of the magnetic head slider upon acceleration and deceleration in the case of the seek operation is started and stopped, in order to remove influence of the rotation moment by the force of inertia when the magnetic head slider is rotated in the internal direction perpendicular to the magnetic disk about the slider supporting point provided in the magnetic head slider supporting mechanism for supporting the slider, a distance from the projected point of the slider supporting point to the rotation center of the carriage on the same plane is coincident with a distance from a projected point on the magnetic disk surface of the center of gravity of the slider to the rotation center of the carriage.

<Aspect 8>

A magnetic head slider which is moved relatively to a magnetic disk to which the magnetic head slider is mounted, comprises two sliding protrusions and one magnetic head element protrusion or one sliding protrusion and two magnetic head element protrusions disposed on an opposing surface to the magnetic disk.

When the three protrusions, a slider supporting point disposed in a magnetic head slider supporting mechanism for supporting the slider and a rotation center of a carriage for moving the magnetic head slider supporting mechanism are projected on a surface parallel to the magnetic disk, one of the protrusions is positioned on a line connecting the slider supporting point and the rotation center of the carriage and two remaining protrusions are positioned so that the line connecting the slider supporting point and the rotation center of the carriage is positioned between the two remaining protrusions.

In order to reduce the rotation moment produced when the magnetic head slider is rotated in the internal direction perpendicular to the magnetic disk about the slider supporting point provided in the magnetic head slider supporting mechanism for supporting the slider by the shearing force acting between the magnetic head and the three protrusions contacting the magnetic head, when the magnetic head slider is disposed on the magnetic disk being rotated, a contact area with the magnetic disk of the protrusion on the side of the inner periphery of the disk, of the two protrusions positioned so that the line connecting the slider supporting point and the rotation center of the carriage is positioned between the two protrusions is larger than a contact area of the protrusion on the side of the outer periphery of the disk.

As described above, in the magnetic head slider according to the present invention, by making the contact area with the magnetic disk of the sliding protrusion on the inner peripheral side larger than the contact area of the protrusion on the outer peripheral side, increasing the shearing force to the magnetic disk of the inner-peripheral-side protrusion and balancing it with the shearing force to the sliding protrusion on the outer peripheral side due to a difference in the peripheral speed, movement of the magnetic head slider can be stabilized.

Further, the magnetic head slider according to the present invention can inversely proportion the area ratio of the sliding protrusions to the peripheral speed of the magnetic disk contacting the protrusions to determine the area ratio suitably so that movement of the magnetic head slider can be stabilized.

In the magnetic head slider having the same contact areas of the inner- and outer-peripheral-side sliding protrusions, by offsetting the magnetic head to the outer sliding protrusion side, the shearing force produced in the inner and outer protrusions about the magnetic head element can be balanced to stabilize movement of the magnetic head slider.

Further, in the magnetic head slider having the same contact areas of the sliding protrusions, by inversely proportioning the offset amount of the magnetic head element to the peripheral speed of the magnetic disk, the offset amount can be determined stably to stabilize movement of the magnetic head slider.

In the magnetic head slider according to the present invention, by making the coarseness of the surface of the contact portion with the magnetic disk of the inner sliding protrusion larger than the coarseness of the surface of the outer protrusion, increasing the shearing force to the magnetic disk of the inner protrusion, and balancing it with the shearing force to the outer sliding protrusion due to a difference in the peripheral speed, movement of the magnetic head slider can be stabilized.

Further, the magnetic head slider supporting mechanism according to the present invention includes the carriage for supporting the magnetic head slider through the supporting portion and being angularly moved on the magnetic disk about the rotation center, and the carriage supports the magnetic head slider through the supporting portion at a position in which the rotation moment produced by the protrusion positioned nearer to the rotation center than the supporting portion of the magnetic head slider is equal to the rotation moment produced by the protrusion positioned farther from the rotation center than the supporting portion of the slider to thereby balance the shearing forces produced in the sliding protrusions and the magnetic head element portion in the seeking operation of the magnetic head slider so that the shearing forces can be balanced even in the seeking operation to stabilize movement of the magnetic head slider.

Accordingly, in the magnetic head slider and the magnetic head slider supporting mechanism of the present invention, the rotation moment in the internal direction perpendicular to the surface of the magnetic disk due to the shearing force produced in the contact portion with the rotating magnetic disk can be reduced and movement of the magnetic head slider can be stabilized to thereby perform recording and reproduction of data satisfactorily. Further, since the rotation moment in the internal direction perpendicular to the surface of the magnetic disk is reduced even in the seeking operation of the magnetic head slider, movement of the magnetic head slider can be stabilized even in the seeking operation. Consequently, the high density recording of the contact type magnetic disk apparatus can be attained.

The present invention has been described in detail, it should be understood that various changes, substitutions and alterations can be made hereto without departing from the spirit and scope of the present invention as defined by the appended claims.

What claimed is:

1. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three sliding pads attached to a sliding member, said sliding member sustained by a gimbal of a load arm, said load arm supported from a carriage, one sliding pad of said three sliding pads being disposed in a backward position in a relative movement of said magnetic head assembly to said magnetic recording medium and mounting on said sliding member a magnetic head for reading and writing data from and to said magnetic recording medium, wherein said three sliding pads contact said magnetic recording medium during reading/writing, and said one sliding pad has a larger area contacting to said magnetic recording medium than a sum of areas of two sliding forward pads of said three sliding pads contacting to said magnetic recording medium;

means for driving said magnetic recording medium contacted by said magnetic head assembly;

means for positioning said magnetic head with respect to said magnetic recording medium; and means for performing writing and reading of magnetic information in a state where said three sliding pads of said magnetic head are brought into contact with said magnetic recording medium.

2. A magnetic storage apparatus according to claim 1, wherein a rotation moment by a first pad of said two sliding forward pads with regard to said gimbal when said magnetic recording medium rotates is substantially canceled by another rotation moment by a second pad of said two sliding forward pads.

3. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three sliding pads attached to a sliding member, said sliding member sustained by a gimbal of a load arm, said load arm supported from a carriage, one sliding pad of said three sliding pads being disposed in a backward position in a relative movement of said magnetic head assembly to the magnetic recording medium and mounting on said sliding member a magnetic head for reading and writing data from and to said magnetic recording medium, wherein said three sliding pads contact said magnetic recording medium during reading/writing, and said one sliding pad has a larger area contacting to said magnetic recording medium than a sum of areas of two sliding forward pads of said three sliding pads contacting to said magnetic recording medium; and means for driving said magnetic recording medium contacted by said magnetic head assembly.

4. A magnetic storage apparatus according to claim 3, wherein a rotation moment by a first pad of said two sliding forward pads with regard to said gimbal when said magnetic recording medium rotates is substantially cancelled by another rotation moment by a second pad of said two sliding forward pads.

5. A magnetic storage apparatus comprising:

a magnetic recording medium including a magnetic thin film layer and a lubricant layer placed thereon;

a magnetic head assembly including three sliding pads attached to a sliding member which is sustained by a gimbal of a load arm supported from a carriage, said three sliding pads all remaining substantially in contact with said magnetic recording medium during reading/writing data from and to said magnetic recording medium, one sliding pad of said three sliding pads being disposed in a backward position in a relative movement of said magnetic head assembly to said magnetic recording medium and mounting on said sliding member a magnetic head for reading and writing data from and to said magnetic recording medium, wherein said one sliding pad has a larger area contacting to said magnetic recording medium than a sum of areas of two sliding forward pads of said three sliding pads contacting to said magnetic recording medium, so that a posture of said magnetic head assembly with respect to said magnetic recording medium is stably maintained;

means for driving said magnetic recording medium contacted by said three sliding pads of said magnetic head assembly;

means for positioning said magnetic head with respect to said magnetic recording medium; and means for performing writing and reading of magnetic information in a state where said three sliding pads of said magnetic head are in contact with said magnetic recording medium.

6. A magnetic storage apparatus comprising:

a magnetic recording medium including a magnetic thin film layer and a lubricant layer placed thereon;

a magnetic head assembly including three sliding pads attached to a sliding member which is sustained by a gimbal of a load arm supported from a carriage, said three sliding pads all remaining substantially in contact with said magnetic recording medium during reading/writing data from and to said magnetic recording medium, one sliding pad of said three sliding pads being disposed in a backward position in a relative movement of said magnetic head assembly to said magnetic recording medium and mounting on said sliding member a magnetic head for reading and writing data from and to said magnetic recording medium, wherein said one sliding pad has a larger area contacting to said magnetic recording medium than a sum of areas of two sliding forward pads of said three sliding pads contacting to said magnetic recording medium, so that a posture of said magnetic head assembly with respect to said magnetic recording medium is stably maintained; and means for driving said magnetic recording medium contacted by said three sliding pads of said magnetic head assembly.

7. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three pads attached to a sliding member, said sliding member sustained by a gimbal of a load arm, said load arm supported from a carriage, one pad of said three pads being disposed in a backward position in a relative movement of said magnetic head assembly to said magnetic recording medium and mounting on said sliding member a magnetic head for reading and writing data from and to said magnetic recording medium, wherein said three pads contact said magnetic recording medium during reading/writing, and said one pad has a larger area contacting to said magnetic recording medium than a sum of areas of two forward pads of said three pads contacting to said magnetic recording medium;

means for driving said magnetic recording medium contacted by said magnetic head assembly;

means for positioning said magnetic head with respect to said magnetic recording medium; and means for performing writing and reading of magnetic information in a state where said three pads of said magnetic head are brought into contact with said magnetic recording medium.

8. A magnetic storage apparatus according to claim 7, wherein a rotation moment by a first pad of said two forward pads with regard to said gimbal when said magnetic recording medium rotates is substantially canceled by another rotation moment by a second pad of said two forward pads.

9. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three pads attached to a sliding member, said sliding member sustained by a gimbal of a load arm, said load arm supported from a carriage, one pad of said three pads being disposed in a backward position in a relative movement of said magnetic head assembly to the magnetic recording medium and mounting on said sliding member a magnetic head for reading and writing data from and to said magnetic recording medium, wherein said three pads contact said magnetic recording medium during reading/writing, and said one pad has a larger area contacting to said magnetic recording medium than a sum of areas of two forward pads of said three pads contacting to said magnetic recording medium; and means for driving said magnetic recording medium contacted by said magnetic head assembly.

10. A magnetic storage apparatus according to claim 9, wherein a rotation moment by a first pad of said two forward pads with regard to said gimbal when said magnetic recording medium rotates is substantially canceled by another rotation moment by a second pad of said two forward pads.

11. A magnetic storage apparatus comprising:

a magnetic recording medium including a magnetic thin film layer and a lubricant layer placed thereon;

a magnetic head assembly including three pads attached to a sliding member which is sustained by a gimbal of a load arm supported from a carriage, said three pads all remaining substantially in contact with said magnetic recording medium during reading/writing data from and to said magnetic recording medium, one pad of said three pads being disposed in a backward position in a relative movement of said magnetic head assembly to said magnetic recording medium and mounting on said sliding member a magnetic head for reading and writing data from and to said magnetic recording medium, wherein said one pad has a larger area contacting to said magnetic recording medium than a sum of areas of two forward pads of said three pads contacting to said magnetic recording medium, so that a posture of said magnetic head assembly with respect to said magnetic recording medium is stably maintained;

means for driving said magnetic recording medium contacted by said three pads of said magnetic head assembly;

means for positioning said magnetic head with respect to said magnetic recording medium; and means for performing writing a nd reading of magnetic information in a state where said three pads of said magnetic head are in contact with said magnetic recording medium.

12. A magnetic storage apparatus comprising:

a magnetic recording medium including a magnetic thin film layer and a lubricant layer placed thereon;

a magnetic head assembly including three pads attached to a sliding member which is sustained by a gimbal of a load arm supported from a carriage, said three pads all remaining substantially in contact with said magnetic recording medium during reading/writing data from and to said magnetic recording medium, one pad of said three pads being disposed in a backward position in a relative movement of said magnetic head assembly to said magnetic recording medium and mounting on said sliding member a magnetic head for reading and writing data from and to said magnetic recording medium, wherein said one pad has a larger area contacting to said magnetic recording medium than a sum of areas of two forward pads of said three pads contacting to said magnetic recording medium, so that a posture of said magnetic head assembly with respect to said magnetic recording medium is stably maintained; and means for driving said magnetic recording medium contacted by said three pads of said magnetic head assembly.

13. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three sliding pads attached to a sliding member, said sliding member sustained by a gimbal of a load arm, said load arm supported from a carriage, one sliding pad of said three sliding pads being disposed in a backward position in a relative movement of said magnetic head assembly to said magnetic recording medium and mounting on said sliding member a magnetic head for reading and writing data from and to said magnetic recording medium, wherein said three sliding pads contact said magnetic recording medium during reading/writing, and said one sliding pad has a larger area contacting to said magnetic recording medium than a sum of areas of two sliding forward pads of said three sliding pads contacting to said magnetic recording medium; and means for performing writing and reading of magnetic information in a state where said three sliding pads of said magnetic head are brought into contact with said magnetic recording medium, wherein a rotation moment by a first sliding forward pad of said two sliding forward pads with regard to said gimbal when said magnetic recording medium rotates is substantially canceled by another rotation moment by an opposite sliding forward pad of said two sliding forward pads.

14. A magnetic storage apparatus comprising:

a magnetic recording medium including a magnetic thin film layer and a lubricant layer placed thereon; and a magnetic head assembly which is brought into contact with said magnetic recording medium to perform an input/output operation, said magnetic head assembly including three sliding pads attached to a sliding member, said sliding member sustained by a gimbal of a load arm, said load arm supported from a carriage, one sliding pad of said three sliding pads being disposed in a backward position in a relative movement of said magnetic head assembly to the magnetic recording medium and mounting on said sliding member a magnetic head for reading and writing data from and to said magnetic recording medium, wherein said three sliding pads contact said magnetic recording medium during reading/writing, and said one sliding pad has a larger area contacting to said magnetic recording medium than a sum of areas of two sliding forward pads of said three sliding pads contacting to said magnetic recording medium;

wherein a rotation moment by a first pad of said two sliding forward pads with regard to said gimbal when said magnetic recording medium rotates is substantially cancelled by another rotation moment by a second pad of said two sliding forward pads.

15. A magnetic storage apparatus comprising:

a magnetic recording medium including a magnetic thin film layer and a lubricant layer placed thereon;

a magnetic head assembly which is brought into contact with said magnetic recording medium to perform an input/output operation, said magnetic head assembly including three pads attached to a sliding member, said sliding member sustained by a gimbal of a load arm, said load arm supported from a carriage, one pad of said three pads being disposed in a backward position in a relative movement of said magnetic head assembly to said magnetic recording medium and mounting on said sliding member a magnetic head for reading and writing data from and to said magnetic recording medium, wherein said three pads contact said magnetic recording medium during reading/writing, and said one pad has a larger area contacting to said magnetic recording medium than a sum of areas of two forward pads of said three pads contacting to said magnetic recording medium; and means for performing writing and reading of magnetic information in a state where said three pads of said magnetic head are brought into contact with said magnetic recording medium;

wherein a rotation moment by a first pad of said two forward pads with regard to said gimbal when said magnetic recording medium rotates is substantially canceled by another rotation moment by a second pad of said two forward pads.

16. A magnetic storage apparatus comprising:

a magnetic recording medium including a magnetic thin film layer and a lubricant layer placed thereon; and a magnetic head assembly which is brought into contact with said magnetic recording medium to perform an input/output operation, said magnetic head assembly including three pads attached to a sliding member, said sliding member sustained by a gimbal of a load arm, said load arm supported from a carriage, one pad of said three pads being disposed in a backward position in a relative movement of said magnetic head assembly to the magnetic recording medium and mounting on said sliding member a magnetic head for reading and writing data from and to said magnetic recording medium, wherein said three pads contact said magnetic recording medium during reading/writing, and said one pad has a larger area contacting to said magnetic recording medium than a sum of areas of two forward pads of said three pads contacting to said magnetic recording medium;

wherein a rotation moment by a first pad of said two forward pads with regard to said gimbal when said magnetic recording medium rotates is substantially canceled by another rotation moment by a second pad of said two forward pads.

* * * * *